US009903271B2

(12) United States Patent
Oelfke et al.

(10) Patent No.: US 9,903,271 B2
(45) Date of Patent: Feb. 27, 2018

(54) LOW EMISSION TRIPLE-CYCLE POWER GENERATION AND $CO_2$ SEPARATION SYSTEMS AND METHODS

(75) Inventors: Russell H. Oelfke, Houston, TX (US); Moses Minta, Missouri City, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 549 days.

(21) Appl. No.: 13/702,538

(22) PCT Filed: Jun. 9, 2011

(86) PCT No.: PCT/US2011/039826
§ 371 (c)(1),
(2), (4) Date: Dec. 6, 2012

(87) PCT Pub. No.: WO2012/003077
PCT Pub. Date: Jan. 5, 2012

(65) Prior Publication Data
US 2013/0104563 A1    May 2, 2013

Related U.S. Application Data

(60) Provisional application No. 61/361,173, filed on Jul. 2, 2010.

(51) Int. Cl.
*F02C 7/00* (2006.01)
*F02C 6/18* (2006.01)
(Continued)

(52) U.S. Cl.
CPC .............. *F02C 3/02* (2013.01); *F02C 1/007* (2013.01); *F02C 6/18* (2013.01); *F02C 7/08* (2013.01);
(Continued)

(58) Field of Classification Search
CPC ......... F02M 25/07; F02B 47/10; F02C 1/007; F02C 6/18; F02C 3/34; Y02E 20/12; Y02E 20/16
(Continued)

(56) References Cited

U.S. PATENT DOCUMENTS 2,488,911 A    11/1949   Hepburn et al.
2,884,758 A     5/1959   Oberle
(Continued)

FOREIGN PATENT DOCUMENTS

| CA | 2231749 | 3/1998 | ............... F23C 9/00 |
| CA | 2550675 | 7/2005 | ............... F02C 3/34 |

(Continued)

OTHER PUBLICATIONS

Ahmed, S. et al. (1998) "Catalytic Partial Oxidation Reforming of Hydrocarbon Fuels," 1998 *Fuel Cell Seminar*, Nov. 16-19, 1998, 7 pgs.
(Continued)

*Primary Examiner* — Lorne Meade
*Assistant Examiner* — Eric Linderman
(74) *Attorney, Agent, or Firm* — ExxonMobil Upstream Research Company Law Department

(57) ABSTRACT

Methods and systems for low emission power generation in combined cycle power plants are provided. One system includes a gas turbine system that stoichiometrically combusts a fuel and an oxidant in the presence of a compressed recycle stream to provide mechanical power and a gaseous exhaust. The compressed recycle stream acts as a diluent to moderate the temperature of the combustion process. A boost compressor can boost the pressure of the gaseous exhaust before being compressed into the compressed recycle stream. A purge stream is tapped off from the compressed recycle stream and directed to a $CO_2$ separator which discharges $CO_2$ and a nitrogen-rich gas which can be expanded in a gas expander to generate additional mechanical power.

15 Claims, 8 Drawing Sheets

(51) Int. Cl.

| | | |
|---|---|---|
| *F02C 3/02* | (2006.01) | |
| *F02C 1/00* | (2006.01) | |
| *F02C 7/22* | (2006.01) | |
| *F02C 7/08* | (2006.01) | |
| *F02B 47/10* | (2006.01) | |
| *F02C 3/34* | (2006.01) | |

(52) U.S. Cl.
CPC ............... *F02C 7/22* (2013.01); *F02B 47/10* (2013.01); *F02C 3/34* (2013.01); *F05D 2220/76* (2013.01); *F05D 2260/61* (2013.01); *F05D 2270/08* (2013.01); *Y02E 20/12* (2013.01); *Y02E 20/16* (2013.01)

(58) Field of Classification Search
USPC .... 60/39.5, 39.52, 39.182, 777, 723, 39.822
See application file for complete search history.

(56) References Cited

U.S. PATENT DOCUMENTS

| | | | | |
|---|---|---|---|---|
| 3,366,373 A | * | 1/1968 | Reed | F02C 6/18 235/145 R |
| 3,561,895 A | | 2/1971 | Michelson | |
| 3,631,672 A | | 1/1972 | Gentile et al. | |
| 3,643,430 A | | 2/1972 | Emory et al. | |
| 3,705,492 A | | 12/1972 | Vickers | 60/39.51 |
| 3,841,382 A | | 10/1974 | Gravis, III et al. | 159/16 R |
| 3,949,548 A | | 4/1976 | Lockwood, Jr. | |
| 4,018,046 A | | 4/1977 | Hurley | |
| 4,033,712 A | * | 7/1977 | Morton | F23N 1/022 123/676 |
| 4,043,395 A | | 8/1977 | Every et al. | 166/263 |
| 4,050,239 A | | 9/1977 | Kappler et al. | 60/39.51 |
| 4,066,214 A | | 1/1978 | Johnson | |
| 4,077,206 A | | 3/1978 | Ayyagari | |
| 4,085,578 A | | 4/1978 | Kydd | |
| 4,092,095 A | | 5/1978 | Straitz, III | |
| 4,101,294 A | | 7/1978 | Kimura | |
| 4,112,676 A | | 9/1978 | DeCorso | |
| 4,117,671 A | | 10/1978 | Neal et al. | |
| 4,160,640 A | | 7/1979 | Maev et al. | 431/9 |
| 4,165,609 A | | 8/1979 | Rudolph | |
| 4,171,349 A | | 10/1979 | Cucuiat et al. | 423/574 |
| 4,204,401 A | | 5/1980 | Earnest | |
| 4,222,240 A | | 9/1980 | Castellano | |
| 4,224,991 A | | 9/1980 | Sowa et al. | |
| 4,236,378 A | | 12/1980 | Vogt | |
| 4,253,301 A | | 3/1981 | Vogt | |
| 4,271,664 A | | 6/1981 | Earnest | 60/39.18 |
| 4,344,486 A | | 8/1982 | Parrish | 166/272 |
| 4,345,426 A | | 8/1982 | Egnell et al. | |
| 4,352,269 A | | 10/1982 | Dineen | |
| 4,380,895 A | | 4/1983 | Adkins | |
| 4,399,652 A | | 8/1983 | Cole et al. | |
| 4,414,334 A | | 11/1983 | Hitzman | 435/262 |
| 4,434,613 A | | 3/1984 | Stahl | 60/39.7 |
| 4,435,153 A | | 3/1984 | Hashimoto et al. | |
| 4,442,665 A | | 4/1984 | Fick et al. | |
| 4,445,842 A | | 5/1984 | Syska | |
| 4,455,614 A | * | 6/1984 | Martz | F01K 23/10 290/40 R |
| 4,479,484 A | | 10/1984 | Davis | |
| 4,480,985 A | | 11/1984 | Davis | |
| 4,488,865 A | | 12/1984 | Davis | |
| 4,498,288 A | | 2/1985 | Vogt | |
| 4,498,289 A | | 2/1985 | Osgerby | 60/39.52 |
| 4,528,811 A | | 7/1985 | Stahl | |
| 4,543,784 A | | 10/1985 | Kirker | |
| 4,548,034 A | | 10/1985 | Maguire | |
| 4,561,245 A | | 12/1985 | Ball | |
| 4,569,310 A | | 2/1986 | Davis | |
| 4,577,462 A | | 3/1986 | Robertson | |
| 4,602,614 A | | 7/1986 | Percival et al. | |
| 4,606,721 A | | 8/1986 | Livingston | |
| 4,613,299 A | | 9/1986 | Backheim | |
| 4,637,792 A | | 1/1987 | Davis | |
| 4,651,712 A | | 3/1987 | Davis | |
| 4,653,278 A | | 3/1987 | Vinson et al. | |
| 4,681,678 A | | 7/1987 | Leaseburge et al. | |
| 4,684,465 A | | 8/1987 | Leaseburge et al. | |
| 4,753,666 A | | 6/1988 | Pastor et al. | 62/24 |
| 4,762,543 A | | 8/1988 | Pantermuehl et al. | 62/28 |
| 4,817,387 A | | 4/1989 | Lashbrook | |
| 4,858,428 A | | 8/1989 | Paul | 60/39.17 |
| 4,895,710 A | | 1/1990 | Hartmann et al. | 423/351 |
| 4,898,001 A | | 2/1990 | Kuroda et al. | |
| 4,946,597 A | | 8/1990 | Sury | |
| 4,976,100 A | | 12/1990 | Lee | 60/39.02 |
| 5,014,785 A | | 5/1991 | Puri et al. | 166/263 |
| 5,044,932 A | | 9/1991 | Martin et al. | |
| 5,073,105 A | | 12/1991 | Martin et al. | |
| 5,084,438 A | | 1/1992 | Matsubara et al. | |
| 5,085,274 A | | 2/1992 | Puri et al. | 166/252 |
| 5,098,282 A | | 3/1992 | Schwartz et al. | |
| 5,123,248 A | | 6/1992 | Monty et al. | 60/740 |
| 5,135,387 A | | 8/1992 | Martin et al. | |
| 5,141,049 A | | 8/1992 | Larsen et al. | 165/133 |
| 5,142,866 A | | 9/1992 | Yanagihara et al. | |
| 5,147,111 A | | 9/1992 | Montgomery | 299/16 |
| 5,154,596 A | | 10/1992 | Schwartz et al. | |
| 5,183,232 A | | 2/1993 | Gale | |
| 5,195,884 A | | 3/1993 | Schwartz et al. | |
| 5,197,289 A | | 3/1993 | Glevicky et al. | |
| 5,238,395 A | | 8/1993 | Schwartz et al. | |
| 5,255,506 A | | 10/1993 | Wilkes et al. | |
| 5,271,905 A | | 12/1993 | Owen et al. | |
| 5,275,552 A | | 1/1994 | Schwartz et al. | |
| 5,295,350 A | | 3/1994 | Child et al. | |
| 5,304,362 A | | 4/1994 | Madsen | |
| 5,325,660 A | | 7/1994 | Taniguchi et al. | |
| 5,332,036 A | | 7/1994 | Shirley et al. | 166/268 |
| 5,344,307 A | | 9/1994 | Schwartz et al. | |
| 5,345,756 A | | 9/1994 | Jahnke et al. | 60/39.02 |
| 5,355,668 A | | 10/1994 | Weil et al. | |
| 5,359,847 A | | 11/1994 | Pillsbury et al. | |
| 5,361,586 A | | 11/1994 | McWhirter et al. | |
| 5,388,395 A | | 2/1995 | Scharpf et al. | 60/39.02 |
| 5,402,847 A | | 4/1995 | Wilson et al. | 166/263 |
| 5,444,971 A | | 8/1995 | Holenbrger | 60/39.02 |
| 5,457,951 A | | 10/1995 | Johnson et al. | |
| 5,458,481 A | | 10/1995 | Surbey et al. | |
| 5,468,270 A | | 11/1995 | Borszynski | |
| 5,490,378 A | | 2/1996 | Berger et al. | 60/39.23 |
| 5,495,709 A | | 3/1996 | Frutschi | 60/39.55 |
| 5,542,840 A | | 8/1996 | Surbey et al. | |
| 5,566,756 A | | 10/1996 | Chaback et al. | 166/263 |
| 5,572,862 A | | 11/1996 | Mowill | |
| 5,581,998 A | | 12/1996 | Craig | |
| 5,584,182 A | | 12/1996 | Althaus et al. | |
| 5,590,518 A | | 1/1997 | Janes | |
| 5,595,059 A | * | 1/1997 | Huber et al. | 60/780 |
| 5,599,179 A | * | 2/1997 | Lindner | F23N 1/02 431/12 |
| 5,628,182 A | | 5/1997 | Mowill | |
| 5,634,329 A | | 6/1997 | Andersson et al. | |
| 5,638,675 A | | 6/1997 | Zysman et al. | |
| 5,640,840 A | | 6/1997 | Briesch | |
| 5,644,911 A | * | 7/1997 | Huber | 60/775 |
| 5,657,631 A | | 8/1997 | Androsov | |
| 5,685,158 A | | 11/1997 | Lenahan et al. | |
| 5,709,077 A | | 1/1998 | Beichel | |
| 5,713,206 A | | 2/1998 | McWhirter et al. | |
| 5,715,673 A | | 2/1998 | Beichel | |
| 5,724,805 A | | 3/1998 | Golomb et al. | 60/39.02 |
| 5,725,054 A | | 3/1998 | Shayegi et al. | 166/263 |
| 5,740,667 A | * | 4/1998 | Bhattacharyya et al. | 60/783 |
| 5,740,786 A | | 4/1998 | Gartner | |
| 5,743,079 A | | 4/1998 | Walsh et al. | |
| 5,765,363 A | | 6/1998 | Mowill | |
| 5,771,867 A | | 6/1998 | Amstutz et al. | |
| 5,771,868 A | | 6/1998 | Khair | |
| 5,819,540 A | | 10/1998 | Massarani | |
| 5,836,164 A | | 11/1998 | Tsukahara et al. | |

(56) References Cited

U.S. PATENT DOCUMENTS

| | | | | |
|---|---|---|---|---|
| 5,839,283 | A | 11/1998 | Dobbeling | |
| 5,850,732 | A | 12/1998 | Willis et al. | |
| 5,894,720 | A | 4/1999 | Willis et al. | |
| 5,901,547 | A | 5/1999 | Smith et al. | 60/39.02 |
| 5,924,275 | A | 7/1999 | Cohen et al. | |
| 5,930,990 | A | 8/1999 | Zachary et al. | |
| 5,937,634 | A | 8/1999 | Etheridge et al. | |
| 5,950,417 | A | 9/1999 | Robertson, Jr. et al. | |
| 5,956,937 | A | 9/1999 | Beichel | |
| 5,968,349 | A | 10/1999 | Duyvesteyn et al. | 208/390 |
| 5,974,780 | A | 11/1999 | Santos | |
| 5,992,388 | A | 11/1999 | Seger | |
| 6,016,658 | A | 1/2000 | Willis et al. | |
| 6,032,465 | A | 3/2000 | Regnier | |
| 6,035,641 | A | 3/2000 | Lokhandwala | |
| 6,062,026 | A | 5/2000 | Woollenweber et al. | |
| 6,079,974 | A | 6/2000 | Thompson | |
| 6,082,093 | A | 7/2000 | Greenwood et al. | 60/39.23 |
| 6,089,855 | A | 7/2000 | Becker et al. | 431/9 |
| 6,094,916 | A | 8/2000 | Puri et al. | |
| 6,101,983 | A | 8/2000 | Anand et al. | |
| 6,148,602 | A | 11/2000 | Demetri | 60/39.05 |
| 6,183,241 | B1 | 2/2001 | Bohn et al. | |
| 6,201,029 | B1 | 3/2001 | Waycuilis | 518/703 |
| 6,202,400 | B1 | 3/2001 | Utamura et al. | 60/39.03 |
| 6,202,442 | B1 | 3/2001 | Brugerolle | |
| 6,202,574 | B1 | 3/2001 | Liljedahl et al. | |
| 6,209,325 | B1 | 4/2001 | Alkabie | |
| 6,216,459 | B1 | 4/2001 | Daudel et al. | |
| 6,216,549 | B1 | 4/2001 | Davis et al. | |
| 6,230,103 | B1 | 5/2001 | DeCorso et al. | |
| 6,237,339 | B1 | 5/2001 | Åsen et al. | |
| 6,247,315 | B1 | 6/2001 | Marin et al. | |
| 6,247,316 | B1 | 6/2001 | Viteri | |
| 6,248,794 | B1 | 6/2001 | Gieskes | |
| 6,253,555 | B1 | 7/2001 | Willis | |
| 6,256,976 | B1 | 7/2001 | Kataoka et al. | |
| 6,256,994 | B1 | 7/2001 | Dillon | 60/649 |
| 6,263,659 | B1 | 7/2001 | Dillon | 60/39.02 |
| 6,266,954 | B1 | 7/2001 | McCallum et al. | |
| 6,269,882 | B1 | 8/2001 | Wellington et al. | |
| 6,276,171 | B1 | 8/2001 | Brugerolle | |
| 6,282,901 | B1 | 9/2001 | Marin et al. | 60/649 |
| 6,283,087 | B1 | 9/2001 | Isaksen | |
| 6,289,666 | B1 | 9/2001 | Ginter | 60/39.05 |
| 6,289,677 | B1 | 9/2001 | Prociw et al. | |
| 6,298,652 | B1 | 10/2001 | Mittricker et al. | 60/39.02 |
| 6,298,654 | B1 | 10/2001 | Vermes et al. | 60/39.02 |
| 6,298,664 | B1 | 10/2001 | Asen et al. | 60/649 |
| 6,299,433 | B1 * | 10/2001 | Gauba | F23N 5/022 431/12 |
| 6,301,888 | B1 | 10/2001 | Gray, Jr. | |
| 6,301,889 | B1 | 10/2001 | Gladden et al. | |
| 6,305,929 | B1 | 10/2001 | Chung et al. | |
| 6,314,721 | B1 | 11/2001 | Mathews et al. | |
| 6,324,867 | B1 | 12/2001 | Fanning et al. | |
| 6,332,313 | B1 | 12/2001 | Willis et al. | 60/39.06 |
| 6,345,493 | B1 | 2/2002 | Smith et al. | 60/39.02 |
| 6,360,528 | B1 | 3/2002 | Brausch et al. | |
| 6,363,709 | B2 | 4/2002 | Kataoka et al. | |
| 6,367,258 | B1 | 4/2002 | Wen et al. | |
| 6,370,870 | B1 | 4/2002 | Kamijo et al. | |
| 6,374,591 | B1 | 4/2002 | Johnson et al. | |
| 6,374,594 | B1 | 4/2002 | Kraft et al. | 60/39.37 |
| 6,383,461 | B1 | 5/2002 | Lang | |
| 6,389,814 | B2 | 5/2002 | Viteri et al. | 60/716 |
| 6,405,536 | B1 | 6/2002 | Ho et al. | 60/742 |
| 6,412,278 | B1 | 7/2002 | Matthews | |
| 6,412,302 | B1 | 7/2002 | Foglietta | |
| 6,412,559 | B1 | 7/2002 | Gunter et al. | 166/271 |
| 6,418,725 | B1 | 7/2002 | Maeda et al. | |
| 6,429,020 | B1 | 8/2002 | Thornton et al. | |
| 6,449,954 | B2 | 9/2002 | Bachmann | |
| 6,450,256 | B2 | 9/2002 | Mones | 166/250.01 |
| 6,461,147 | B1 | 10/2002 | Sonju et al. | |
| 6,467,270 | B2 | 10/2002 | Mulloy et al. | |
| 6,470,682 | B2 | 10/2002 | Gray, Jr. | |
| 6,477,859 | B2 | 11/2002 | Wong et al. | 62/617 |
| 6,484,503 | B1 | 11/2002 | Raz | |
| 6,484,507 | B1 | 11/2002 | Pradt | |
| 6,487,863 | B1 | 12/2002 | Chen et al. | |
| 6,490,858 | B2 | 12/2002 | Barrett et al. | |
| 6,499,990 | B1 | 12/2002 | Zink et al. | |
| 6,502,383 | B1 | 1/2003 | Janardan et al. | |
| 6,505,567 | B1 | 1/2003 | Anderson et al. | |
| 6,508,209 | B1 | 1/2003 | Collier | 123/3 |
| 6,523,349 | B2 | 2/2003 | Viteri | |
| 6,532,745 | B1 | 3/2003 | Neary | |
| 6,539,716 | B2 | 4/2003 | Finger et al. | |
| 6,584,775 | B1 | 7/2003 | Schneider et al. | |
| 6,598,398 | B2 | 7/2003 | Viteri et al. | |
| 6,598,399 | B2 | 7/2003 | Liebig | |
| 6,598,402 | B2 | 7/2003 | Kataoka et al. | 60/775 |
| 6,606,861 | B2 | 8/2003 | Snyder | |
| 6,612,291 | B2 | 9/2003 | Sakamoto | |
| 6,615,576 | B2 | 9/2003 | Sheoran et al. | |
| 6,615,589 | B2 | 9/2003 | Allam et al. | |
| 6,622,470 | B2 | 9/2003 | Viteri et al. | |
| 6,637,183 | B2 | 10/2003 | Viteri et al. | 60/39.182 |
| 6,644,041 | B1 | 11/2003 | Eyermann | |
| 6,655,150 | B1 | 12/2003 | Asen et al. | 60/772 |
| 6,668,541 | B2 | 12/2003 | Rice et al. | |
| 6,672,863 | B2 | 1/2004 | Doebbeling et al. | |
| 6,675,579 | B1 | 1/2004 | Yang | |
| 6,684,643 | B2 | 2/2004 | Frutschi | |
| 6,694,735 | B2 | 2/2004 | Sumser et al. | |
| 6,698,412 | B2 | 3/2004 | Dalla Betta | |
| 6,702,570 | B2 | 3/2004 | Shah et al. | 431/11 |
| 6,706,186 | B1 | 3/2004 | Nyman et al. | 210/634 |
| 6,722,436 | B2 | 4/2004 | Krill | 166/303 |
| 6,725,665 | B2 | 4/2004 | Tuschy et al. | |
| 6,731,501 | B1 | 5/2004 | Cheng | |
| 6,732,531 | B2 | 5/2004 | Dickey | |
| 6,742,506 | B1 | 6/2004 | Grandin | |
| 6,743,829 | B2 | 6/2004 | Fischer-Calderon et al. | |
| 6,745,573 | B2 | 6/2004 | Marin et al. | 60/775 |
| 6,745,624 | B2 | 6/2004 | Porter et al. | |
| 6,748,004 | B2 | 6/2004 | Jepson | |
| 6,752,620 | B2 | 6/2004 | Heier et al. | |
| 6,767,527 | B1 | 7/2004 | Åsen et al. | |
| 6,772,583 | B2 | 8/2004 | Bland | |
| 6,790,030 | B2 | 9/2004 | Fischer et al. | 431/8 |
| 6,805,483 | B2 | 10/2004 | Tomlinson et al. | |
| 6,810,673 | B2 | 11/2004 | Snyder | |
| 6,813,889 | B2 | 11/2004 | Inoue et al. | |
| 6,817,187 | B2 | 11/2004 | Yu | |
| 6,821,501 | B2 | 11/2004 | Matzakos et al. | |
| 6,823,852 | B2 | 11/2004 | Collier, Jr. | |
| 6,824,710 | B2 | 11/2004 | Viteri et al. | |
| 6,826,912 | B2 | 12/2004 | Levy et al. | |
| 6,826,913 | B2 | 12/2004 | Wright | |
| 6,838,071 | B1 | 1/2005 | Olsvik et al. | |
| 6,851,413 | B1 | 2/2005 | Tamol, Sr. | |
| 6,868,677 | B2 | 3/2005 | Viteri et al. | |
| 6,886,334 | B2 | 5/2005 | Shirakawa | |
| 6,887,069 | B1 | 5/2005 | Thornton et al. | |
| 6,899,859 | B1 | 5/2005 | Olsvik | |
| 6,901,760 | B2 | 6/2005 | Dittmann et al. | |
| 6,904,815 | B2 | 6/2005 | Widmer | |
| 6,907,737 | B2 | 6/2005 | Mittricker et al. | 60/772 |
| 6,910,335 | B2 | 6/2005 | Viteri et al. | 60/786 |
| 6,923,915 | B2 | 8/2005 | Alford et al. | |
| 6,945,029 | B2 | 9/2005 | Viteri | 60/39.17 |
| 6,945,052 | B2 | 9/2005 | Frutschi et al. | |
| 6,945,087 | B2 | 9/2005 | Porter et al. | |
| 6,945,089 | B2 | 9/2005 | Barie et al. | |
| 6,946,419 | B2 | 9/2005 | Kaefer | |
| 6,969,123 | B2 | 11/2005 | Vinegar et al. | |
| 6,971,242 | B2 | 12/2005 | Boardman | |
| 6,981,358 | B2 | 1/2006 | Bellucci et al. | |
| 6,988,549 | B1 | 1/2006 | Babcock | |
| 6,993,901 | B2 | 2/2006 | Shirakawa | |
| 6,993,916 | B2 | 2/2006 | Johnson et al. | |
| 6,994,491 | B2 | 2/2006 | Kittle | |

(56) References Cited

U.S. PATENT DOCUMENTS

| | | | | |
|---|---|---|---|---|
| 7,007,487 | B2* | 3/2006 | Belokon et al. | 60/777 |
| 7,010,921 | B2 | 3/2006 | Intile et al. | |
| 7,011,154 | B2 | 3/2006 | Maher et al. | |
| 7,015,271 | B2 | 3/2006 | Bice et al. | |
| 7,032,388 | B2 | 4/2006 | Healy | |
| 7,040,400 | B2 | 5/2006 | de Rouffignac et al. | |
| 7,043,898 | B2 | 5/2006 | Rago | |
| 7,043,920 | B2 | 5/2006 | Viteri et al. | 60/716 |
| 7,056,482 | B2 | 6/2006 | Hakka et al. | |
| 7,059,152 | B2 | 6/2006 | Oakey et al. | |
| 7,065,953 | B1 | 6/2006 | Kopko | 60/39.3 |
| 7,065,972 | B2 | 6/2006 | Zupanc et al. | |
| 7,074,033 | B2 | 7/2006 | Neary | |
| 7,077,199 | B2 | 7/2006 | Vinegar et al. | |
| 7,089,743 | B2 | 8/2006 | Frutschi et al. | 60/772 |
| 7,096,942 | B1 | 8/2006 | de Rouffignac et al. | |
| 7,097,925 | B2 | 8/2006 | Keefer | |
| 7,104,319 | B2 | 9/2006 | Vinegar et al. | |
| 7,104,784 | B1 | 9/2006 | Hasegawa et al. | |
| 7,124,589 | B2 | 10/2006 | Neary | 60/784 |
| 7,137,256 | B1 | 11/2006 | Stuttaford et al. | |
| 7,137,623 | B2 | 11/2006 | Mockry et al. | |
| 7,143,572 | B2 | 12/2006 | Ooka et al. | 60/39.182 |
| 7,143,606 | B2 | 12/2006 | Tranier | |
| 7,146,969 | B2 | 12/2006 | Weirich | |
| 7,147,461 | B2 | 12/2006 | Neary | 431/5 |
| 7,162,875 | B2 | 1/2007 | Fletcher et al. | |
| 7,168,265 | B2 | 1/2007 | Briscoe et al. | |
| 7,168,488 | B2 | 1/2007 | Olsvik et al. | |
| 7,185,497 | B2 | 3/2007 | Dudebout et al. | |
| 7,194,869 | B2 | 3/2007 | McQuiggan et al. | |
| 7,197,880 | B2 | 4/2007 | Thornton et al. | |
| 7,225,623 | B2 | 6/2007 | Koshoffer | |
| 7,237,385 | B2 | 7/2007 | Carrea | |
| 7,284,362 | B2 | 10/2007 | Marin et al. | 60/39.182 |
| 7,299,619 | B2 | 11/2007 | Briesch et al. | |
| 7,302,801 | B2 | 12/2007 | Chen | |
| 7,305,817 | B2 | 12/2007 | Blodgett et al. | |
| 7,305,831 | B2 | 12/2007 | Carrea et al. | 60/772 |
| 7,313,916 | B2 | 1/2008 | Pellizzari | |
| 7,318,317 | B2 | 1/2008 | Carrea | |
| 7,343,742 | B2 | 3/2008 | Wimmer et al. | |
| 7,353,655 | B2 | 4/2008 | Bolis et al. | |
| 7,357,857 | B2 | 4/2008 | Hart et al. | 208/391 |
| 7,363,756 | B2 | 4/2008 | Carrea et al. | 60/39.52 |
| 7,363,764 | B2 | 4/2008 | Griffin et al. | |
| 7,381,393 | B2 | 6/2008 | Lynn | |
| 7,401,577 | B2 | 7/2008 | Saucedo et al. | 122/448.1 |
| 7,410,525 | B1 | 8/2008 | Liu et al. | |
| 7,416,137 | B2 | 8/2008 | Hagen et al. | |
| 7,434,384 | B2 | 10/2008 | Lord et al. | |
| 7,438,744 | B2 | 10/2008 | Beaumont | |
| 7,467,942 | B2 | 12/2008 | Carroni et al. | |
| 7,472,550 | B2 | 1/2009 | Lear et al. | 62/238.3 |
| 7,481,048 | B2 | 1/2009 | Harmon et al. | |
| 7,481,275 | B2 | 1/2009 | Olsvik et al. | 166/303 |
| 7,482,500 | B2 | 1/2009 | Johann et al. | |
| 7,485,761 | B2 | 2/2009 | Schindler et al. | |
| 7,488,857 | B2 | 2/2009 | Johann et al. | |
| 7,490,472 | B2* | 2/2009 | Lynghjem et al. | 60/772 |
| 7,491,250 | B2 | 2/2009 | Hershkowitz et al. | 48/198.7 |
| 7,492,054 | B2 | 2/2009 | Catlin | |
| 7,493,769 | B2 | 2/2009 | Jangili | |
| 7,498,009 | B2 | 3/2009 | Leach et al. | |
| 7,503,178 | B2 | 3/2009 | Bucker et al. | 60/774 |
| 7,506,501 | B2 | 3/2009 | Anderson et al. | |
| 7,513,099 | B2 | 4/2009 | Nuding et al. | |
| 7,513,100 | B2 | 4/2009 | Motter et al. | |
| 7,516,626 | B2 | 4/2009 | Brox et al. | 62/643 |
| 7,520,134 | B2 | 4/2009 | Durbin et al. | |
| 7,536,252 | B1* | 5/2009 | Hibshman, II | F02C 3/34 60/605.2 |
| 7,536,873 | B2 | 5/2009 | Nohlen | 62/644 |
| 7,540,150 | B2 | 6/2009 | Schmid et al. | |
| 7,559,977 | B2 | 7/2009 | Fleischer et al. | 95/236 |
| 7,562,519 | B1 | 7/2009 | Harris et al. | |
| 7,562,529 | B2 | 7/2009 | Kuspert et al. | |
| 7,566,394 | B2 | 7/2009 | Koseoglu | 208/309 |
| 7,574,856 | B2 | 8/2009 | Mak | |
| 7,591,866 | B2 | 9/2009 | Bose | |
| 7,594,386 | B2 | 9/2009 | Narayanan et al. | |
| 7,610,759 | B2 | 11/2009 | Yoshida et al. | |
| 7,611,681 | B2 | 11/2009 | Kaefer | |
| 7,614,352 | B2 | 11/2009 | Anthony et al. | |
| 7,618,606 | B2 | 11/2009 | Fan et al. | |
| 7,631,493 | B2 | 12/2009 | Shirakawa et al. | |
| 7,635,408 | B2 | 12/2009 | Mak et al. | |
| 7,637,093 | B2 | 12/2009 | Rao | 60/39.52 |
| 7,644,573 | B2 | 1/2010 | Smith et al. | |
| 7,650,744 | B2 | 1/2010 | Varatharajan et al. | 60/39.12 |
| 7,654,320 | B2 | 2/2010 | Payton | 166/257 |
| 7,654,330 | B2 | 2/2010 | Zubrin et al. | |
| 7,655,071 | B2 | 2/2010 | De Vreede | |
| 7,670,135 | B1 | 3/2010 | Zink et al. | |
| 7,674,443 | B1 | 3/2010 | Davis | |
| 7,677,309 | B2 | 3/2010 | Shaw et al. | |
| 7,682,597 | B2 | 3/2010 | Blumenfeld et al. | |
| 7,690,204 | B2 | 4/2010 | Drnevich et al. | |
| 7,695,703 | B2 | 4/2010 | Sobolevskiy et al. | |
| 7,717,173 | B2 | 5/2010 | Grott | |
| 7,728,736 | B2* | 6/2010 | Leeland | F23N 5/02 340/578 |
| 7,734,408 | B2 | 6/2010 | Shiraki | |
| 7,749,311 | B2 | 7/2010 | Saito et al. | |
| 7,752,848 | B2 | 7/2010 | Chellappa et al. | 60/780 |
| 7,752,850 | B2 | 7/2010 | Laster et al. | 60/794 |
| 7,753,039 | B2 | 7/2010 | Harima et al. | |
| 7,762,084 | B2 | 7/2010 | Martis et al. | 60/792 |
| 7,763,163 | B2 | 7/2010 | Koseoglu | |
| 7,763,227 | B2 | 7/2010 | Wang | |
| 7,765,810 | B2 | 8/2010 | Pfefferle | 60/777 |
| 7,789,159 | B1 | 9/2010 | Bader | |
| 7,789,658 | B2 | 9/2010 | Towler et al. | |
| 7,789,944 | B2 | 9/2010 | Saito et al. | |
| 7,793,494 | B2 | 9/2010 | Wirth et al. | |
| 7,824,179 | B2 | 11/2010 | Hasegawa et al. | |
| 7,827,778 | B2* | 11/2010 | Finkenrath et al. | 60/39.52 |
| 7,827,794 | B1 | 11/2010 | Pronske et al. | |
| 7,841,186 | B2 | 11/2010 | So et al. | |
| 7,845,406 | B2 | 12/2010 | Nitschke | |
| 7,861,511 | B2* | 1/2011 | Chillar et al. | 60/39.52 |
| 7,874,350 | B2 | 1/2011 | Pfefferle | |
| 7,882,692 | B2 | 2/2011 | Pronske et al. | |
| 7,886,522 | B2 | 2/2011 | Kammel | |
| 7,906,304 | B2 | 3/2011 | Kohr | |
| 7,914,749 | B2 | 3/2011 | Carstens et al. | |
| 7,918,906 | B2 | 4/2011 | Zubrin et al. | |
| 7,922,871 | B2 | 4/2011 | Price et al. | |
| 7,931,712 | B2 | 4/2011 | Zubrin et al. | |
| 7,931,731 | B2 | 4/2011 | Van Heeringen et al. | |
| 7,931,888 | B2 | 4/2011 | Drnevich et al. | |
| 7,934,926 | B2 | 5/2011 | Kornbluth et al. | |
| 7,942,003 | B2 | 5/2011 | Baudoin et al. | |
| 7,943,097 | B2 | 5/2011 | Golden et al. | |
| 7,955,403 | B2 | 6/2011 | Ariyapadi et al. | |
| 7,966,822 | B2 | 6/2011 | Myers et al. | |
| 7,980,312 | B1 | 7/2011 | Hill et al. | |
| 7,985,399 | B2 | 7/2011 | Drnevich et al. | |
| 7,988,750 | B2 | 8/2011 | Lee et al. | |
| 8,001,789 | B2 | 8/2011 | Vega et al. | |
| 8,029,273 | B2 | 10/2011 | Paschereit et al. | |
| 8,036,813 | B2 | 10/2011 | Tonetti et al. | |
| 8,038,416 | B2 | 10/2011 | Ono et al. | |
| 8,046,986 | B2 | 11/2011 | Chillar et al. | |
| 8,047,007 | B2 | 11/2011 | Zubrin et al. | |
| 8,051,638 | B2 | 11/2011 | Aljabari et al. | |
| 8,061,120 | B2 | 11/2011 | Hwang | |
| 8,062,617 | B2 | 11/2011 | Stakhev et al. | |
| 8,065,870 | B2 | 11/2011 | Jobson et al. | |
| 8,065,874 | B2 | 11/2011 | Fong et al. | |
| 8,074,439 | B2 | 12/2011 | Foret | |
| 8,080,225 | B2 | 12/2011 | Dickinson et al. | |
| 8,097,230 | B2 | 1/2012 | Mesters et al. | |
| 8,101,146 | B2 | 1/2012 | Fedeyko et al. | |

(56) References Cited

U.S. PATENT DOCUMENTS

| | | | |
|---|---|---|---|
| 8,105,559 B2 | 1/2012 | Melville et al. | |
| 8,110,012 B2 | 2/2012 | Chiu et al. | |
| 8,117,846 B2 | 2/2012 | Wilbraham | |
| 8,127,558 B2 | 3/2012 | Bland et al. | |
| 8,127,936 B2 | 3/2012 | Liu et al. | |
| 8,127,937 B2 | 3/2012 | Liu et al. | |
| 8,166,766 B2 | 5/2012 | Draper | |
| 8,191,360 B2 | 6/2012 | Fong et al. | |
| 8,191,361 B2 | 6/2012 | Fong et al. | |
| 8,196,387 B2 | 6/2012 | Shah et al. | |
| 8,196,413 B2 | 6/2012 | Mak | |
| 8,205,455 B2 | 6/2012 | Popovic | |
| 8,206,669 B2 | 6/2012 | Schaffer et al. | |
| 8,209,192 B2 | 6/2012 | Gil et al. | |
| 8,215,105 B2 | 7/2012 | Fong et al. | |
| 8,220,247 B2 | 7/2012 | Wijmans et al. | |
| 8,220,268 B2 | 7/2012 | Callas | |
| 8,225,600 B2 | 7/2012 | Theis | |
| 8,226,912 B2 | 7/2012 | Kloosterman et al. | |
| 8,240,142 B2 | 8/2012 | Fong et al. | |
| 8,240,153 B2 | 8/2012 | Childers et al. | |
| 8,245,492 B2 | 8/2012 | Draper | |
| 8,245,493 B2 | 8/2012 | Minto | |
| 8,247,462 B2 | 8/2012 | Boshoff et al. | |
| 8,257,476 B2 | 9/2012 | White et al. | |
| 8,261,823 B1 | 9/2012 | Hill et al. | |
| 8,262,343 B2 | 9/2012 | Hagen | |
| 8,266,883 B2* | 9/2012 | Dion Ouellet | F02C 7/277 60/39.182 |
| 8,266,913 B2 | 9/2012 | Snook et al. | |
| 8,268,044 B2 | 9/2012 | Wright et al. | |
| 8,281,596 B1 | 10/2012 | Rohrssen et al. | |
| 8,316,665 B2 | 11/2012 | Mak | |
| 8,337,613 B2 | 12/2012 | Zauderer | |
| 8,347,600 B2 | 1/2013 | Wichmann et al. | |
| 8,371,100 B2 | 2/2013 | Draper | |
| 8,372,251 B2 | 2/2013 | Goller et al. | |
| 8,377,184 B2 | 2/2013 | Fujikawa et al. | |
| 8,377,401 B2 | 2/2013 | Darde et al. | |
| 8,388,919 B2 | 3/2013 | Hooper et al. | |
| 8,397,482 B2 | 3/2013 | Kraemer et al. | |
| 8,398,757 B2 | 3/2013 | Iijima et al. | |
| 8,409,307 B2 | 4/2013 | Drnevich et al. | |
| 8,414,694 B2 | 4/2013 | Iijima et al. | |
| 8,424,601 B2 | 4/2013 | Betzer-Zilevitch | |
| 8,436,489 B2 | 5/2013 | Stahlkopf et al. | |
| 8,453,461 B2 | 6/2013 | Draper | |
| 8,453,462 B2 | 6/2013 | Wichmann et al. | |
| 8,454,350 B2 | 6/2013 | Berry et al. | |
| 8,475,160 B2 | 7/2013 | Campbell et al. | |
| 8,539,749 B1 | 9/2013 | Wichmann et al. | |
| 8,555,796 B2 | 10/2013 | D'Agostini | |
| 8,627,643 B2 | 1/2014 | Chillar et al. | |
| 2001/0000049 A1 | 3/2001 | Kataoka et al. | |
| 2001/0015061 A1 | 8/2001 | Viteri et al. | 60/39.161 |
| 2001/0029732 A1 | 10/2001 | Bachmann | |
| 2001/0045090 A1 | 11/2001 | Gray, Jr. | |
| 2002/0036086 A1 | 3/2002 | Minkkinen et al. | 166/266 |
| 2002/0043063 A1 | 4/2002 | Kataoka et al. | |
| 2002/0053207 A1 | 5/2002 | Finger et al. | |
| 2002/0069648 A1 | 6/2002 | Levy et al. | |
| 2002/0166323 A1 | 11/2002 | Marin et al. | 60/775 |
| 2002/0187449 A1 | 12/2002 | Doebbeling et al. | |
| 2003/0000436 A1 | 1/2003 | Vladimir | 110/347 |
| 2003/0005698 A1 | 1/2003 | Keller | |
| 2003/0056517 A1 | 3/2003 | Brushwood et al. | |
| 2003/0131582 A1 | 7/2003 | Anderson et al. | 60/39.55 |
| 2003/0134241 A1 | 7/2003 | Marin et al. | 431/9 |
| 2003/0152879 A1* | 8/2003 | Fischer | F02M 25/00 431/8 |
| 2003/0221409 A1 | 12/2003 | McGowan | 60/39.17 |
| 2003/0235529 A1 | 12/2003 | Hershkowitz et al. | 423/652 |
| 2004/0006994 A1 | 1/2004 | Walsh et al. | |
| 2004/0068981 A1 | 4/2004 | Siefker et al. | |
| 2004/0128975 A1 | 7/2004 | Viteri | 60/39.55 |
| 2004/0148941 A1 | 8/2004 | Wylie | 60/772 |
| 2004/0154793 A1 | 8/2004 | Zapadinski | 166/256 |
| 2004/0166034 A1 | 8/2004 | Kaefer | |
| 2004/0170558 A1 | 9/2004 | Hershkowitz | 423/652 |
| 2004/0170559 A1 | 9/2004 | Hershkowitz et al. | 423/652 |
| 2004/0175326 A1 | 9/2004 | Hershkowitz et al. | 423/652 |
| 2004/0180973 A1 | 9/2004 | Hershkowitz | 518/703 |
| 2004/0191166 A1 | 9/2004 | Hershkowitz et al. | 423/652 |
| 2004/0206091 A1 | 10/2004 | Yee et al. | 60/777 |
| 2004/0211165 A1* | 10/2004 | Hosokawa | F02C 7/057 60/39.23 |
| 2004/0219079 A1 | 11/2004 | Hagen et al. | 422/194 |
| 2004/0223408 A1 | 11/2004 | Mathys et al. | |
| 2004/0238654 A1 | 12/2004 | Hagen et al. | |
| 2004/0241505 A1 | 12/2004 | Hershkowitz et al. | 429/17 |
| 2005/0022499 A1 | 2/2005 | Belokon et al. | 60/39.511 |
| 2005/0028529 A1 | 2/2005 | Bartlett et al. | 60/772 |
| 2005/0123874 A1 | 6/2005 | Abbasi et al. | 431/351 |
| 2005/0132713 A1 | 6/2005 | Neary | 60/784 |
| 2005/0137269 A1 | 6/2005 | Hershkowitz et al. | 518/702 |
| 2005/0144961 A1 | 7/2005 | Colibaba-Evulet et al. | 60/780 |
| 2005/0154068 A1 | 7/2005 | Hershkowitz et al. | 518/703 |
| 2005/0186130 A1 | 8/2005 | Hughes et al. | 423/219 |
| 2005/0197267 A1 | 9/2005 | Zaki et al. | 510/245 |
| 2005/0201929 A1 | 9/2005 | Hershkowitz et al. | 423/652 |
| 2005/0229585 A1 | 10/2005 | Webster | |
| 2005/0236602 A1 | 10/2005 | Viteri et al. | 252/372 |
| 2006/0005542 A1 | 1/2006 | Campbell et al. | 60/723 |
| 2006/0112675 A1 | 6/2006 | Anderson et al. | |
| 2006/0112696 A1* | 6/2006 | Lynghjem | B01D 53/62 60/772 |
| 2006/0127827 A1 | 6/2006 | Yoshida et al. | 431/8 |
| 2006/0158961 A1 | 7/2006 | Ruscheweyh et al. | |
| 2006/0183009 A1 | 8/2006 | Berlowitz et al. | 429/19 |
| 2006/0188760 A1 | 8/2006 | Hershkowitz et al. | 429/17 |
| 2006/0196812 A1 | 9/2006 | Beetge et al. | 208/435 |
| 2006/0231252 A1 | 10/2006 | Shaw et al. | 166/272.3 |
| 2006/0240370 A1* | 10/2006 | Neville | F23C 6/047 431/12 |
| 2006/0248888 A1 | 11/2006 | Geskes | |
| 2006/0260290 A1 | 11/2006 | Rao | 60/39.53 |
| 2007/0000242 A1 | 1/2007 | Harmon et al. | |
| 2007/0006565 A1 | 1/2007 | Fleischer et al. | 60/39.5 |
| 2007/0006592 A1* | 1/2007 | Balan | F02C 3/22 60/772 |
| 2007/0034171 A1* | 2/2007 | Griffin | F01K 21/047 122/479.1 |
| 2007/0044475 A1 | 3/2007 | Leser et al. | |
| 2007/0044479 A1 | 3/2007 | Brandt et al. | 60/783 |
| 2007/0089425 A1 | 4/2007 | Motter et al. | |
| 2007/0107430 A1 | 5/2007 | Schmid et al. | |
| 2007/0125063 A1 | 6/2007 | Evulat | 60/39.15 |
| 2007/0130957 A1 | 6/2007 | Hoffmann et al. | 60/780 |
| 2007/0144747 A1 | 6/2007 | Steinberg | 166/402 |
| 2007/0144940 A1 | 6/2007 | Hershkowitz et al. | 208/107 |
| 2007/0178035 A1 | 8/2007 | White et al. | 423/248 |
| 2007/0220864 A1 | 9/2007 | Haugen | 60/286 |
| 2007/0227156 A1 | 10/2007 | Saito et al. | 60/772 |
| 2007/0231233 A1 | 10/2007 | Bose | |
| 2007/0234702 A1 | 10/2007 | Hagen et al. | |
| 2007/0237696 A1 | 10/2007 | Payton | 423/228 |
| 2007/0240425 A1 | 10/2007 | Malavasi et al. | 60/775 |
| 2007/0245736 A1 | 10/2007 | Barnicki | 60/670 |
| 2007/0249738 A1 | 10/2007 | Haynes et al. | 518/703 |
| 2007/0272201 A1 | 11/2007 | Amano et al. | 123/295 |
| 2007/0295640 A1 | 12/2007 | Tan et al. | 208/22 |
| 2008/0000229 A1 | 1/2008 | Kuspert et al. | |
| 2008/0006561 A1 | 1/2008 | Moran et al. | 208/45 |
| 2008/0010967 A1* | 1/2008 | Griffin | B01D 53/22 60/39.182 |
| 2008/0016868 A1 | 1/2008 | Ochs et al. | 60/688 |
| 2008/0034727 A1 | 2/2008 | Sutikno | |
| 2008/0038598 A1 | 2/2008 | Berlowitz et al. | 429/17 |
| 2008/0047280 A1 | 2/2008 | Dubar | |
| 2008/0066443 A1 | 3/2008 | Frutschi et al. | 60/39.53 |
| 2008/0083226 A1 | 4/2008 | Joshi et al. | 60/772 |
| 2008/0092539 A1 | 4/2008 | Marshall et al. | 60/599 |
| 2008/0104938 A1 | 5/2008 | Finkenrath et al. | 60/39.5 |
| 2008/0104939 A1 | 5/2008 | Hoffmann et al. | 60/39.5 |

(56) References Cited

U.S. PATENT DOCUMENTS

| | | | |
|---|---|---|---|
| 2008/0104958 A1 | 5/2008 | Finkenrath et al. | 60/605.2 |
| 2008/0115478 A1 | 5/2008 | Sullivan | |
| 2008/0115495 A1 | 5/2008 | Rising | 60/731 |
| 2008/0118310 A1 | 5/2008 | Graham | 405/129.95 |
| 2008/0127632 A1 | 6/2008 | Finkenrath et al. | 60/274 |
| 2008/0141643 A1* | 6/2008 | Varatharajan | F02C 1/002 60/39.5 |
| 2008/0142409 A1 | 6/2008 | Sankaranarayanan et al. | 208/62 |
| 2008/0155984 A1 | 7/2008 | Liu et al. | 60/649 |
| 2008/0173584 A1 | 7/2008 | White et al. | 210/656 |
| 2008/0178611 A1 | 7/2008 | Ding | |
| 2008/0202123 A1 | 8/2008 | Sullivan et al. | |
| 2008/0223038 A1 | 9/2008 | Lutz et al. | |
| 2008/0250795 A1 | 10/2008 | Katdare et al. | |
| 2008/0251234 A1 | 10/2008 | Wilson et al. | |
| 2008/0275278 A1 | 11/2008 | Clark | 585/240 |
| 2008/0290719 A1 | 11/2008 | Kaminsky et al. | 299/3 |
| 2008/0302107 A1 | 12/2008 | Fan et al. | 60/783 |
| 2008/0309087 A1 | 12/2008 | Evulet et al. | 290/52 |
| 2008/0317651 A1 | 12/2008 | Hooper et al. | 423/230 |
| 2009/0000762 A1 | 1/2009 | Wilson et al. | |
| 2009/0038247 A1 | 2/2009 | Taylor et al. | 52/287.1 |
| 2009/0056342 A1 | 3/2009 | Kirzhner | |
| 2009/0064653 A1 | 3/2009 | Hagen et al. | 60/39.3 |
| 2009/0071166 A1 | 3/2009 | Hagen et al. | |
| 2009/0100754 A1 | 4/2009 | Gil | 48/201 |
| 2009/0107141 A1 | 4/2009 | Chillar et al. | |
| 2009/0117024 A1 | 5/2009 | Weedon et al. | 423/437.1 |
| 2009/0120087 A1 | 5/2009 | Sumser et al. | |
| 2009/0120088 A1* | 5/2009 | Chillar | F02C 3/34 60/605.2 |
| 2009/0133400 A1 | 5/2009 | Callas | 60/730 |
| 2009/0145127 A1 | 6/2009 | Vollmer et al. | 60/618 |
| 2009/0157230 A1 | 6/2009 | Hibshman, II et al. | |
| 2009/0193809 A1 | 8/2009 | Schroder et al. | 60/762 |
| 2009/0194809 A1 | 8/2009 | Gil et al. | 166/267 |
| 2009/0205334 A1 | 8/2009 | Aljabari et al. | 60/605.2 |
| 2009/0218821 A1 | 9/2009 | ElKady et al. | 290/52 |
| 2009/0223227 A1 | 9/2009 | Lipinski et al. | |
| 2009/0229263 A1 | 9/2009 | Ouellet et al. | |
| 2009/0235637 A1 | 9/2009 | Foret | |
| 2009/0235671 A1 | 9/2009 | Rabovitser et al. | 60/806 |
| 2009/0241506 A1 | 10/2009 | Nilsson | 60/39.24 |
| 2009/0250264 A1 | 10/2009 | Dupriest | 175/40 |
| 2009/0255242 A1 | 10/2009 | Paterson et al. | |
| 2009/0262599 A1 | 10/2009 | Kohrs et al. | |
| 2009/0284013 A1* | 11/2009 | Anand | B01D 53/8625 290/52 |
| 2009/0301054 A1 | 12/2009 | Simpson et al. | 60/39.15 |
| 2009/0301099 A1 | 12/2009 | Nigro | 60/775 |
| 2010/0003123 A1 | 1/2010 | Smith | |
| 2010/0018218 A1 | 1/2010 | Riley et al. | 60/783 |
| 2010/0028142 A1 | 2/2010 | Hashimoto et al. | 415/200 |
| 2010/0058732 A1 | 3/2010 | Kaufmann et al. | |
| 2010/0064855 A1 | 3/2010 | Lanyi et al. | 75/458 |
| 2010/0077941 A1 | 4/2010 | D'Agostini | 110/188 |
| 2010/0077946 A1 | 4/2010 | D'Agostini | |
| 2010/0115960 A1 | 5/2010 | Brautsch et al. | 60/772 |
| 2010/0126176 A1 | 5/2010 | Kim | 60/748 |
| 2010/0126181 A1* | 5/2010 | Ranasinghe | F02C 1/08 60/782 |
| 2010/0162703 A1 | 7/2010 | Li et al. | 60/670 |
| 2010/0170251 A1* | 7/2010 | Davis, Jr. | F02C 7/228 60/740 |
| 2010/0170253 A1 | 7/2010 | Berry et al. | |
| 2010/0174466 A1* | 7/2010 | Davis, Jr. | F02C 7/22 701/100 |
| 2010/0180565 A1* | 7/2010 | Draper | F02C 1/007 60/39.52 |
| 2010/0300102 A1 | 12/2010 | Bathina et al. | |
| 2010/0310439 A1 | 12/2010 | Brok et al. | 423/222 |
| 2010/0314136 A1 | 12/2010 | Zubrin et al. | 166/402 |
| 2010/0322759 A1 | 12/2010 | Tanioka | |
| 2010/0326084 A1* | 12/2010 | Anderson | F01K 23/10 60/775 |
| 2011/0000221 A1 | 1/2011 | Minta et al. | 60/783 |
| 2011/0000671 A1 | 1/2011 | Hershkowitz et al. | |
| 2011/0023488 A1 | 2/2011 | Fong et al. | 60/659 |
| 2011/0036082 A1 | 2/2011 | Collinot | |
| 2011/0048002 A1 | 3/2011 | Taylor et al. | |
| 2011/0048010 A1 | 3/2011 | Balcezak et al. | |
| 2011/0072779 A1 | 3/2011 | Elkady et al. | |
| 2011/0088379 A1 | 4/2011 | Nanda | |
| 2011/0110759 A1 | 5/2011 | Sanchez et al. | |
| 2011/0126512 A1 | 6/2011 | Anderson | |
| 2011/0138766 A1 | 6/2011 | Elkady et al. | |
| 2011/0162353 A1 | 7/2011 | Vanvolsem et al. | |
| 2011/0205837 A1 | 8/2011 | Gentgen | |
| 2011/0219777 A1 | 9/2011 | Wijmans et al. | 60/772 |
| 2011/0226010 A1 | 9/2011 | Baxter | |
| 2011/0227346 A1 | 9/2011 | Klenven | |
| 2011/0239653 A1 | 10/2011 | Valeev et al. | |
| 2011/0265447 A1 | 11/2011 | Cunningham | |
| 2011/0027018 A1 | 12/2011 | Baker et al. | 405/128.6 |
| 2011/0289932 A1* | 12/2011 | Thompson | F02C 3/30 60/776 |
| 2011/0300493 A1 | 12/2011 | Mittricker et al. | |
| 2012/0023954 A1 | 2/2012 | Wichmann | |
| 2012/0023955 A1 | 2/2012 | Draper | |
| 2012/0023956 A1 | 2/2012 | Popovic | |
| 2012/0023957 A1 | 2/2012 | Draper et al. | |
| 2012/0023958 A1 | 2/2012 | Snook et al. | |
| 2012/0023960 A1 | 2/2012 | Minto | |
| 2012/0023962 A1 | 2/2012 | Wichmann et al. | |
| 2012/0023963 A1 | 2/2012 | Wichmann et al. | |
| 2012/0023966 A1 | 2/2012 | Ouellet et al. | |
| 2012/0031581 A1 | 2/2012 | Chillar et al. | |
| 2012/0032810 A1 | 2/2012 | Chillar et al. | |
| 2012/0085100 A1 | 4/2012 | Hughes et al. | |
| 2012/0096870 A1 | 4/2012 | Wichmann et al. | |
| 2012/0119512 A1 | 5/2012 | Draper | |
| 2012/0144837 A1 | 6/2012 | Rasmussen et al. | |
| 2012/0185144 A1 | 7/2012 | Draper | |
| 2012/0192565 A1 | 8/2012 | Tretyakov et al. | |
| 2012/0247105 A1 | 10/2012 | Nelson et al. | |
| 2012/0260660 A1 | 10/2012 | Kraemer et al. | |
| 2012/0279230 A1* | 11/2012 | Botarelli | F02C 9/00 60/773 |
| 2013/0042624 A1* | 2/2013 | Botarelli | F02C 9/00 60/772 |
| 2013/0074512 A1* | 3/2013 | Tillery | F01D 17/141 60/773 |
| 2013/0086916 A1 | 4/2013 | Oelfke et al. | |
| 2013/0086917 A1 | 4/2013 | Slobodyanskiy et al. | |
| 2013/0091853 A1* | 4/2013 | Denton | F02C 1/007 60/772 |
| 2013/0091854 A1* | 4/2013 | Gupta | F02C 1/007 60/772 |
| 2013/0098054 A1* | 4/2013 | Guethe | F02C 9/263 60/773 |
| 2013/0104562 A1* | 5/2013 | Oelfke | F02C 1/007 60/773 |
| 2013/0104563 A1 | 5/2013 | Oelfke et al. | |
| 2013/0125554 A1 | 5/2013 | Mittricker et al. | |
| 2013/0125555 A1 | 5/2013 | Mittricker et al. | |
| 2013/0219910 A1* | 8/2013 | Botarelli | F02C 9/00 60/776 |
| 2013/0232980 A1 | 9/2013 | Chen et al. | |
| 2013/0269310 A1 | 10/2013 | Wichmann et al. | |
| 2013/0269311 A1 | 10/2013 | Wichmann et al. | |
| 2013/0269355 A1 | 10/2013 | Wichmann et al. | |
| 2013/0269356 A1 | 10/2013 | Butkiewicz et al. | |
| 2013/0269357 A1 | 10/2013 | Wichmann et al. | |
| 2013/0269358 A1 | 10/2013 | Wichmann et al. | |
| 2013/0269360 A1 | 10/2013 | Wichmann et al. | |
| 2013/0269361 A1 | 10/2013 | Wichmann et al. | |
| 2013/0269362 A1 | 10/2013 | Wichmann et al. | |
| 2013/0283808 A1 | 10/2013 | Kolvick | |
| 2014/0000271 A1* | 1/2014 | Mittricker | F02C 3/30 60/772 |

(56) References Cited

U.S. PATENT DOCUMENTS

| | | | |
|---|---|---|---|
| 2014/0000273 A1* | 1/2014 | Mittricker | F02C 3/34 60/773 |
| 2014/0007590 A1 | 1/2014 | Huntington et al. | |
| 2014/0013766 A1 | 1/2014 | Mittricker et al. | |
| 2014/0020398 A1* | 1/2014 | Mittricker | F02C 3/34 60/772 |
| 2014/0047818 A1* | 2/2014 | Oelkfe | F02C 1/08 60/274 |
| 2014/0208755 A1* | 7/2014 | Ekanayake | F15D 1/025 60/722 |
| 2014/0208764 A1* | 7/2014 | Ekanayake | G01F 1/74 60/773 |
| 2014/0230445 A1* | 8/2014 | Huntington | F01K 23/10 60/772 |

FOREIGN PATENT DOCUMENTS

| | | | |
|---|---|---|---|
| CA | 2645450 | 9/2007 | C01G 1/00 |
| CA | 2614669 | 12/2008 | B03B 9/02 |
| CN | 1996652 | 7/2007 | H01M 8/00 |
| EP | 0453059 | 6/1994 | F01K 23/06 |
| EP | 0770771 | 5/1997 | |
| EP | 0654639 | 9/1998 | F23R 3/14 |
| GB | 0776269 | 6/1957 | |
| GB | 2117053 | 2/1983 | F02C 3/22 |
| GB | 2397349 | 7/2004 | F02C 3/22 |
| JP | 2000-337107 | 12/2000 | F01K 21/04 |
| WO | WO1995/021683 | 8/1995 | B01D 53/14 |
| WO | WO1997/007329 | 2/1997 | F02C 6/00 |
| WO | WO1999/006674 | 2/1999 | F01K 23/10 |
| WO | WO1999/063210 | 12/1999 | F02C 3/34 |
| WO | WO2005/064232 | 7/2005 | F23C 6/04 |
| WO | WO2006/107209 | 10/2006 | F01K 23/00 |
| WO | WO2007/068682 | 6/2007 | E21B 43/16 |
| WO | WO2008/074980 | 6/2008 | C01B 3/38 |
| WO | WO2008142009 | 11/2008 | |
| WO | WO2008/155242 | 12/2008 | F02C 3/34 |
| WO | WO2009/120779 | 10/2009 | F02B 17/00 |
| WO | WO2009/121008 | 10/2009 | B01J 15/00 |
| WO | WO2010/044958 | 4/2010 | F02C 9/00 |
| WO | WO2010/066048 | 6/2010 | F22B 1/22 |
| WO | WO2010/141777 | 12/2010 | F02C 9/00 |
| WO | WO2011003606 | 1/2011 | |
| WO | WO2011/028322 | 3/2011 | E21B 43/40 |
| WO | WO2012/003076 | 1/2012 | F02C 7/08 |
| WO | WO2012/003077 | 1/2012 | F02C 6/00 |
| WO | WO2012/003078 | 1/2012 | F02C 3/34 |
| WO | WO2012/003079 | 1/2012 | F02C 3/34 |
| WO | WO2012/003080 | 1/2012 | F02C 6/00 |
| WO | WO2012/003489 | 1/2012 | F16K 3/28 |
| WO | WO2012/018457 | 2/2012 | F02C 3/20 |
| WO | WO2012/018458 | 2/2012 | F02C 3/00 |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |

OTHER PUBLICATIONS

Anderson, R. E. (2006) "Durability and Reliability Demonstration of a Near-Zero-Emission Gas-Fired Power Plant," *California Energy Comm.*, CEC 500-2006-074, 80 pgs.

Baxter, E. et al. (2003) "Fabricate and Test an Advanced Non-Polluting Turbine Drive Gas Generator," *U. S. Dept. of Energy, Nat'l Energy Tech. Lab.*, DE-FC26-00NT 40804, 51 pgs.

Bolland, O. et al. (1998) "Removal of $CO_2$ From Gas Turbine Power Plants Evaluation of Pre- and Postcombustion Methods," *SINTEF Group*, 1998, www.energy.sintef.no/publ/xergi/98/3/art-8engelsk.htm, 11 pgs.

BP Press Release (2006) "BP and Edison Mission Group Plan Major Hydrogen Power Project for California," Feb. 10, 2006, www.bp.com/hydrogenpower, 2 pgs.

Bryngelsson, M. et al. (2005) "Feasibility Study of CO2 Removal From Pressurized Flue Gas in a Fully Fired Combined Cycle—The Sargas Project," *KTH—Royal Institute of Technology, Dept. of Chemical Engineering and Technology*, 9 pgs.

Clark, Hal (2002) "Development of a Unique Gas Generator for a Non-Polluting Power Plant," *California Energy Commission Feasibility Analysis*, P500-02-011F, Mar. 2002, 42 pgs.

Ditaranto, M. et al. (2006) "Combustion Instabilities in Sudden Expansion Oxy-Fuel Flames," *ScienceDirect, Combustion and Flame*, v.146, Jun. 30, 2006, pp. 493-51.

Elwell, L. C. et al. (2005) "Technical Overview of Carbon Dioxide Capture Technologies for Coal-Fired Power Plants," *MPR Associates, Inc.*, Jun. 22, 2005, 15 pgs.

Ertesvag, I. S. et al. (2005) "Exergy Analysis of a Gas-Turbin Combined-Cycle Power Plant With Precombustion $CO_2$ Capture," Elsivier, 2004, pp. 5-39.

Luby, P. et al. (2003) "Zero Carbon Power Generation: IGCC as the Premium Option," *Powergen International*, 19 pgs.

MacAdam, S. et al. (2008) "Coal-Based Oxy-Fuel System Evaluation and Combustor Development," *Clean Energy Systems, Inc.* 6 pgs.

Morehead, H. (2007) "Siemens Global Gasification and IGCC Update," *Siemens, Coal-Gen*, Aug. 3, 2007, 17 pgs.

Reeves, S. R. (2001) "Geological Sequestration of $CO_2$ in Deep, Unmineable Coalbeds: An Integrated Research and Commercial-Scale Field Demonstration Project," *SPE* 71749, 10 pgs.

Reeves, S. R. (2003) "Enhanced Coalbed Methane Recovery," *SPE* 101466-DL, 8 pgs.

Richards, G. A. et al. (2001) "Advanced Steam Generators," *National Energy Technology Laboratory*, 7 pgs.

Snarheim, D. et al. (2006) "Control Design for a Gas Turbine Cycle With $CO_2$ Capture Capabilities," *Modeling, Identification and Control*, vol. 00, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," *Department of Energy and Process Eng., Norwegian Univ. of Science and Technology*, 9 pgs.

VanHemert, P. et al. (2006) "Adsorption of Carbon Dioxide and a Hydrogen-Carbon Dioxide Mixture," *Intn'l Coalbed Methane Symposium (Tuscaloosa, AL) Paper* 0615, 9 pgs.

Zhu, J. et al. (2002) "Recovery of Coalbed Methane by Gas Injection," *SPE* 75255, 15 pgs.

Air Separation Technology Ion Transport Membrane—Air Products 2008.

Air Separation Technology Ion Transport Membrane—Air Products 2011.

Foy, Kirsten et al. (2005) "Comparison of Ion Transport Membranes"—Fourth Annual Conference on Carbon Capture and Sequestration, DOE/NETL; May 2005, 11 pages.

Cho, J. H. et al. (2005) "Marrying LNG and Power Generation," *Energy Markets*; Oct./Nov. 2005; 10, 8; ABI/INFORM Trade & Industry, p. 28.

Ciulia, Vincent. About.com. Auto Repair. How the Engine Works. 2001-2003.

Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v. 5, paper No. 81, Edmonton, AB, Canada, Aug. 7-12, 1988, pp. 41-44.

Cryogenics. Science Clarified. 2012. http://www.scienceclarified.com/Co-Di/Cryogenics.html.

Defrate, L. A. et al. (1959) "Optimum Design of Ejector Using Digital Computers" Chem. Eng. Prog. Symp. Ser., 55 ( 21) pp. 46.

Eriksson, Sara. Licentiate Thesis 2005, p. 22. KTH—"Development of Methane Oxidation Catalysts for Different Gas Turbine Combustor Concepts." The Royal Institute of Technology, Department of Chemical Engineering and Technology, Chemical Technology, Stockholm Sweden.

(56) References Cited

OTHER PUBLICATIONS

Evulet, Andrei T. et al. "Application of Exhaust Gas Recirculation in a DLN F-Class Combustion System for Postcombustion Carbon Capture" ASME J. Engineering for Gas Turbines and Power, vol. 131, May 2009.
Evulet, Andrei T. et al. "On the Performance and Operability of GE's Dry Low Nox Combustors utilizing Exhaust Gas Recirculation for Post-Combustion Carbon Capture" Energy Procedia I 2009, 3809-3816.
http://www.turbineinletcooling.org/resources/papers/CTIC_WetCompression_Shepherd_ASMETurboExpo2011.pdf , Shepherd, IGTI 2011—CTIC Wet Compression, Jun. 8, 2011.
Nanda, R. et al. (2007) "Utilizing Air Based Technologies as Heat Source for LNG Vaporization," presented at the 86$^{th}$ Annual convention of the *Gas Processors of America* (GPA 2007), Mar. 11-14, 2007, San Antonio, TX.
Rosetta, M. J. et al. (2006) "Integrating Ambient Air Vaporization Technology with Waste Heat Recovery—A Fresh Approach to LNG Vaporization," presented at the 85$^{th}$ annual convention of the *Gas Processors of America* (GPA 2006), Grapevine, Texas, Mar. 5-8, 2006.
U.S. Appl. No. 13/596,684, filed Aug. 28, 2012, Slobodyanskiy et al.
U.S. Appl. No. 14/066,579, filed Oct. 29, 2013, Huntington et al.
U.S. Appl. No. 14/066,551, filed Oct. 29, 2013, Minto.
U.S. Appl. No. 14/144,511, filed Dec. 30, 2013, Thatcher et al.
U.S. Appl. No. 14/067,559, filed Oct. 30, 2013, Lucas John Stoia et al.
PCT/RU2013/000162, filed Feb. 28, 2013, General Electric Company.
U.S. Appl. No. 14/067,679, filed Oct. 30, 2013, Elizabeth Angelyn Fadde et al.
U.S. Appl. No. 14/067,714, filed Oct. 30, 2013, Carolyn Ashley Antoniono et al.
U.S. Appl. No. 14/067.726, filed Oct. 30, 2013, Carolyn Ashley Antoniono et al.
U.S. Appl. No. 14/067,731, filed Oct. 30, 2013, Carolyn Ashley Antoniono et al.
U.S. Appl. No. 14/067,739, filed Oct. 30, 2013, Carolyn Ashley Antoniono et al.
U.S. Appl. No. 14/067,797, filed Oct. 31, 2013, Anthony Wayne Krull et al.
U.S. Appl. No. 14/066,488, filed Oct. 29, 2013, Pramod K. Biyani et al.
U.S. Appl. No. 14/135,055, filed Dec. 19, 2013, Pramod K. Biyani et al.
U.S. Appl. No. 14/067,844, filed Oct. 30, 2013, John Farrior Woodall et al.
PCT/US13/036020, filed Apr. 10, 2013 General Electric Company/ExxonMobil Upstream Company.
U.S. Appl. No. 14/067,486, filed Oct. 30, 2013, Huntington et al.
U.S. Appl. No. 14/067,537, filed Oct. 30, 2013, Huntington et al.
U.S. Appl. No. 14/067,552, filed Oct. 30, 2013, Huntington et al.
U.S. Appl. No. 14/067,563, filed Oct. 30, 2013, Huntington et al.

\* cited by examiner

LOW EMISSION TRIPLE-CYCLE POWER GENERATION AND CO₂ SEPARATION SYSTEMS AND METHODS

CROSS-REFERENCE TO RELATED APPLICATIONS

This application is the National Stage entry under 35 U.S.C. 371 of PCT/US2011/039826, that published as WO 2012/003077 and was filed on 9 Jun. 2011 which claims the benefit of U.S. Provisional Application No. 61/361,173, filed on 2 Jul. 2010, each of which is incorporated by reference, in its entirety, for all purposes.

This application contains subject matter related to PCT/US2011/042870, that published as WO 2012/003489 and was filed on 1 Jul. 2011; PCT/US2011/039824, that published as WO 2012/003076 and was filed on 9 Jun. 2011; PCT/US2011/039828, that published as WO 2012/003078 and was filed on 9 Jun. 2011; PCT/US2011/039829, that published as WO 2012/003079 and was filed on 9 Jun. 2011; and PCT/US2011/039830, that published as WO 2012/003080 and was filed on 9 Jun. 2011.

FIELD OF THE DISCLOSURE

Embodiments of the disclosure relate to low emission power generation in combined-cycle power systems. More particularly, embodiments of the disclosure relate to methods and apparatuses for stoichiometrically combusting a fuel for enhanced $CO_2$ manufacture and capture, and expansion or compression of nitrogen-rich gas.

BACKGROUND OF THE DISCLOSURE

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Many oil producing countries are experiencing strong domestic growth in power demand and have an interest in enhanced oil recovery (EOR) to improve oil recovery from their reservoirs. Two common EOR techniques include nitrogen ($N_2$) injection for reservoir pressure maintenance and carbon dioxide ($CO_2$) injection for miscible flooding for EOR. There is also a global concern regarding green house gas (GHG) emissions. This concern combined with the implementation of cap-and-trade policies in many countries make reducing $CO_2$ emissions a priority for these and other countries as well as the companies that operate hydrocarbon production systems therein.

Some approaches to lower $CO_2$ emissions include fuel de-carbonization or post-combustion capture using solvents, such as amines. However, both of these solutions are expensive and reduce power generation efficiency, resulting in lower power production, increased fuel demand and increased cost of electricity to meet domestic power demand. In particular, the presence of oxygen, $SO_X$, and $NO_X$ components makes the use of amine solvent absorption very problematic. Another approach is an oxyfuel gas turbine in a combined cycle (e.g., where exhaust heat from the gas turbine Brayton cycle is captured to make steam and produce additional power in a Rankin cycle). However, there are no commercially available gas turbines that can operate in such a cycle and the power required to produce high purity oxygen significantly reduces the overall efficiency of the process. Several studies have compared these processes and show some of the advantages of each approach. See, e.g. BOLLAND, OLAV, and UNDRUM, HENRIETTE, *Removal of $CO_2$ from Gas Turbine Power Plants: Evaluation of pre- and post-combustion methods*, SINTEF Group, found at http://www.energy.sintef.no/publ/xergi/98/3/3 art-8-engelsk.htm (1998).

Other approaches to lower $CO_2$ emissions include stoichiometric exhaust gas recirculation, such as in natural gas combined cycles (NGCC). In a conventional NGCC system, only about 40% of the air intake volume is required to provide adequate stoichiometric combustion of the fuel, while the remaining 60% of the air volume serves to moderate the temperature and cool the flue gas so as to be suitable for introduction into the succeeding expander, but also disadvantageously generate an excess oxygen byproduct which is difficult to remove. The typical NGCC produces low pressure flue gas which requires a fraction of the power produced to extract the $CO_2$ for sequestration or EOR, thereby reducing the thermal efficiency of the NGCC. Further, the equipment for the $CO_2$ extraction is large and expensive, and several stages of compression are required to take the ambient pressure gas to the pressure required for EOR or sequestration. Such limitations are typical of post-combustion carbon capture from low pressure flue gas associated with the combustion of other fossil fuels, such as coal.

Accordingly, there is still a substantial need for a low emission, high efficiency power generation and $CO_2$ capture or manufacture process.

SUMMARY OF THE DISCLOSURE

The present disclosure is directed to triple-cycle power generation systems and methods of operating the system. In one exemplary system, an integrated system comprises a gas turbine system, an exhaust gas recirculation system, and a gas expander. The gas turbine system has a first combustion chamber configured to stoichiometrically combust a first compressed oxidant and a first fuel in the presence of a compressed recycle stream. The combustion chamber directs a first discharge stream to an expander to generate a gaseous exhaust stream and at least partially drive a main compressor. The exhaust gas recirculation system receives the gaseous exhaust stream from the expander of the gas turbine system and produces power from the heat energy contained therein, such as through a heat recovery steam generation unit. The exhaust gas recirculation system further routes the exhaust gas stream to the main compressor where it is compressed to generate the compressed recycle stream. The compressed recycle stream is directed to the combustion chamber to act as a diluent configured to moderate the temperature of the first discharge stream. The integrated system further includes a $CO_2$ separator fluidly coupled to the compressed recycle stream via a purge stream. The $CO_2$ separator generates a $CO_2$-rich stream and a residual stream, comprising nitrogen-rich gas, from the purge stream. As indicated above, the integrated system also includes a gas expander. The gas expander is fluidly coupled to the $CO_2$ separator via the residual stream as is adapted to generate power by expanding the residual stream.

In an exemplary method of operating a triple-cycle power generation system, a method of generating power may comprise stoichiometrically combusting a first compressed oxidant and a first fuel in a first combustion chamber and in the presence of a compressed recycle stream. The combustion may thereby generate a first discharge stream. The compressed recycle stream may act as a diluent configured to moderate the temperature of the first discharge stream. The method further includes expanding the first discharge stream in an expander to at least partially drive a first compressor and generate a gaseous exhaust stream. The expansion of the first discharge stream may generate additional power for other uses. The method further includes directing the gaseous exhaust stream into the first compressor, wherein the first compressor compresses the gaseous exhaust stream and thereby generates the compressed recycle stream. Still further, the method includes extracting a portion of the compressed recycle stream to a $CO_2$ separator via a purge stream, the $CO_2$ separator being fluidly coupled to a gas expander via a residual stream derived from the $CO_2$ separator and consisting primarily of nitrogen-rich gas. The exemplary method further includes expanding the residual stream in a gas expander to generate mechanical power and an exhaust gas.

BRIEF DESCRIPTION OF THE DRAWINGS

The foregoing and other advantages of the present disclosure may become apparent upon reviewing the following detailed description and drawings of non-limiting examples of embodiments in which.

DETAILED DESCRIPTION OF THE DISCLOSURE

Figure 1:
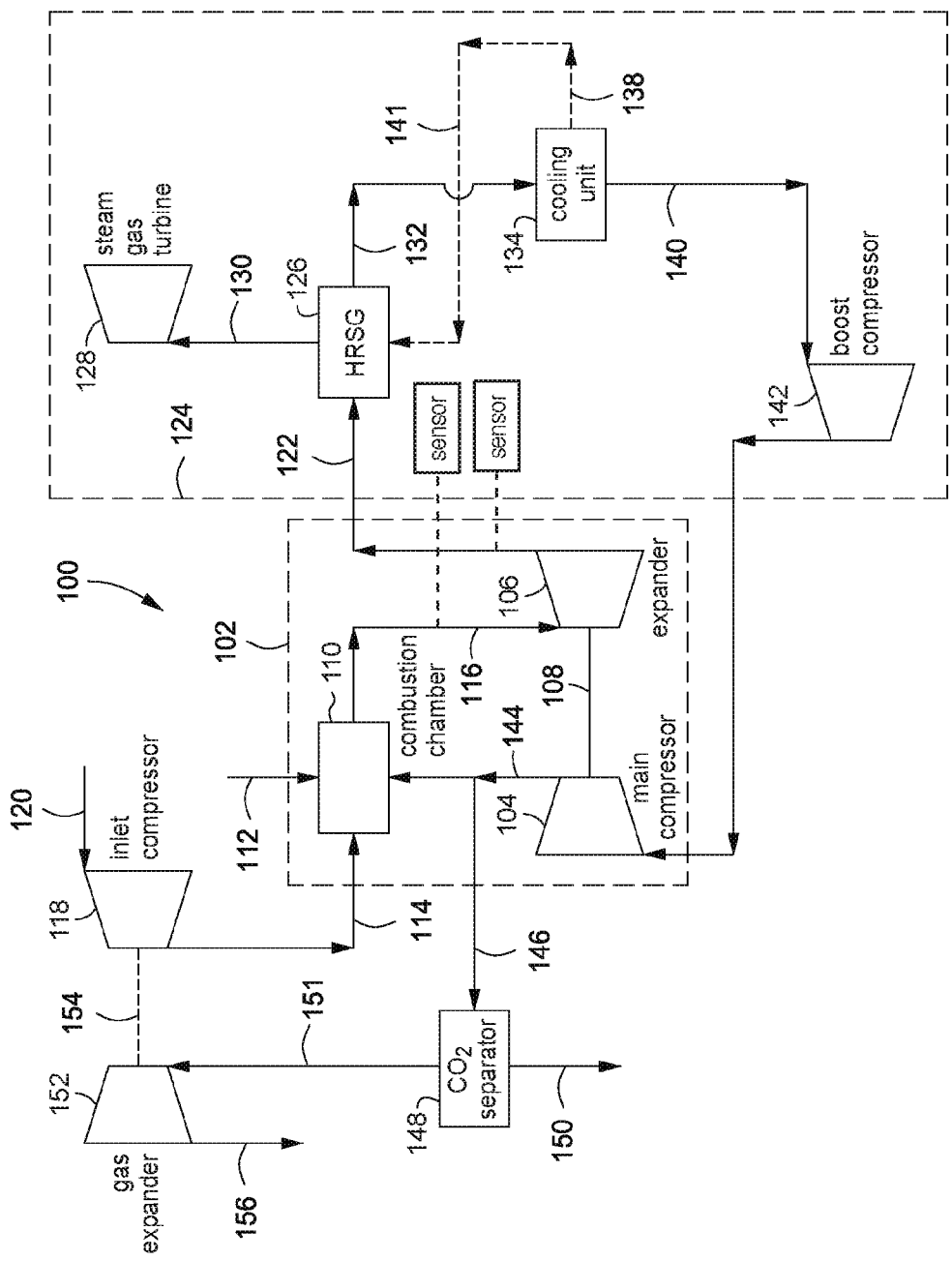
FIG. 1 depicts an integrated system for low emission power generation and enhanced $CO_2$ recovery, according to one or more embodiments of the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($CH_4$) as a major component, i.e. greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., hydrogen sulfide, carbon dioxide), or any combination thereof. The natural gas can also contain minor amounts of contaminants such as water, nitrogen, iron sulfide, wax, crude oil, or any combination thereof.

As used herein, the term "stoichiometric combustion" refers to a combustion reaction having a volume of reactants comprising a fuel and an oxidizer and a volume of products formed by combusting the reactants where the entire volume of the reactants is used to form the products. As used herein, the term "substantially stoichiometric combustion" refers to a combustion reaction having a molar ratio of combustion fuel to oxygen ranging from about plus or minus 10% of the oxygen required for a stoichiometric ratio or more preferably from about plus or minus 5% of the oxygen required for the stoichiometric ratio. For example, the stoichiometric ratio of fuel to oxygen for methane is 1:2 ($CH_4+2O_2>CO_2+2H_2O$). Propane will have a stoichiometric ratio of fuel to oxygen of 1:5. Another way of measuring substantially stoichiometric combustion is as a ratio of oxygen supplied to oxygen required for stoichiometric combustion, such as from about 0.9:1 to about 1.1:1, or more preferably from about 0.95:1 to about 1.05:1

As used herein, the term "stream" refers to a volume of fluids, although use of the term stream typically means a moving volume of fluids (e.g., having a velocity or mass flow rate). The term "stream," however, does not require a velocity, mass flow rate, or a particular type of conduit for enclosing the stream.

Embodiments of the presently disclosed systems and processes may be used to produce ultra low emission electric power and $CO_2$ for enhanced oil recovery (EOR) or sequestration applications. According to embodiments disclosed herein, a mixture of air and fuel can be stoichiometrically combusted and simultaneously mixed with a stream of recycled exhaust gas. The stream of recycled exhaust gas, generally including products of combustion such as $CO_2$, can be used as a diluent to control or otherwise moderate the temperature of the stoichiometric combustion and flue gas entering the succeeding expander.

Combustion at near stoichiometric conditions (or "slightly rich" combustion) can prove advantageous in order to eliminate the cost of excess oxygen removal. By cooling the flue gas and condensing the water out of the stream, a relatively high content $CO_2$ stream can be produced. While a portion of the recycled exhaust gas can be utilized for temperature moderation in the closed Brayton cycle, a remaining purge stream can be used for EOR applications and electric power can be produced with little or no $SO_X$, $NO_X$, or $CO_2$ being emitted to the atmosphere. For example, according to embodiments disclosed herein, the purge stream can be treated in a $CO_2$ separator adapted to discharge a nitrogen-rich gas which can be subsequently expanded in a gas expander to generate additional mechanical power. The result of the systems disclosed herein is the production of power in three separate cycles and the manufacturing or capture of additional $CO_2$ at a more economically efficient level. In some implementations, the nitrogen-rich discharge stream may be heated through various means to increase the power obtainable through the expander on the nitrogen stream. Additionally, in some implementations, the nitrogen vent following the expander can be cooled and used to provide refrigeration, which can be used to improve the efficiency of the compressor(s) in the Brayton cycle and/or in recycling the exhaust gas. The cold nitrogen stream could also be used in other applications that improve the process efficiency.

Alternatively, the discharged nitrogen-rich gas can be sent to EOR facilities for additional compression and/or injection into wells for oil recovery and/or pressure maintenance. Although it is possible to produce nitrogen for reservoir pressure maintenance and $CO_2$ for EOR completely independently, embodiments disclosed herein take advantage of the synergies that are possible when both nitrogen and $CO_2$ are produced in an integrated process to accomplish the production of these gases at a much lower cost while also producing power.

Referring now to the figures, FIG. 1 illustrates a power generation system 100 configured to provide an improved post-combustion $CO_2$ capture process using a combined-cycle arrangement. In at least one embodiment, the power generation system 100 can include a gas turbine system 102 that can be characterized as a closed Brayton cycle. In one embodiment, the gas turbine system 102 can have a first or main compressor 104 coupled to an expander 106 through a common shaft 108 or other mechanical, electrical, or other power coupling, thereby allowing a portion of the mechanical energy generated by the expander 106 to drive the compressor 104. The expander 106 may generate power for other uses as well. The gas turbine system 102 can be a standard gas turbine, where the main compressor 104 and expander 106 form the compressor and expander ends, respectively, of the standard gas turbine. In other embodiments, however, the main compressor 104 and expander 106 can be individualized components in a system 102.

The gas turbine system 102 can also include a combustion chamber 110 configured to combust a fuel stream 112 mixed with a compressed oxidant 114. In one or more embodiments, the fuel stream 112 can include any suitable hydrocarbon gas or liquid, such as natural gas, methane, ethane, naphtha, butane, propane, syngas, diesel, kerosene, aviation fuel, coal derived fuel, bio-fuel, oxygenated hydrocarbon feedstock, or combinations thereof. The compressed oxidant 114 can be derived from a second or inlet compressor 118 fluidly coupled to the combustion chamber 110 and adapted to compress a feed oxidant 120. In one or more embodiments, the feed oxidant 120 can include any suitable gas containing oxygen, such as air, oxygen-rich air, oxygen-depleted air, pure oxygen, or combinations thereof.

As will be described in more detail below, the combustion chamber 110 can also receive a compressed recycle stream 144, including a flue gas primarily having $CO_2$ and nitrogen components. The compressed recycle stream 144 can be derived from the main compressor 104 and adapted to help facilitate the stoichiometric combustion of the compressed oxidant 114 and fuel 112, and also increase the $CO_2$ concentration in the working fluid. A discharge stream 116 directed to the inlet of the expander 106 can be generated as a product of combustion of the fuel stream 112 and the compressed oxidant 114, in the presence of the compressed recycle stream 144. In at least one embodiment, the fuel stream 112 can be primarily natural gas, thereby generating a discharge 116 including volumetric portions of vaporized water, $CO_2$, nitrogen, nitrogen oxides (NOx), and sulfur oxides ($SO_X$). In some embodiments, a small portion of unburned fuel 112 or other compounds may also be present in the discharge 116 due to combustion equilibrium limitations. As the discharge stream 116 expands through the expander 106 it generates mechanical power to drive the main compressor 104, an electrical generator, or other facilities, and also produces a gaseous exhaust stream 122 having a heightened $CO_2$ content.

The power generation system 100 can also include an exhaust gas recirculation (EGR) system 124. While the EGR system 124 illustrated in the figures incorporates various apparati, the illustrated configurations are representative only and any system that recirculates the exhaust gas 122 back to the main compressor may be used. In one or more embodiments, the EGR system 124 can include a heat recovery steam generator (HRSG) 126, or similar device, fluidly coupled to a steam gas turbine 128. In at least one embodiment, the combination of the HRSG 126 and the steam gas turbine 128 can be characterized as a closed Rankine cycle. In combination with the gas turbine system 102, the HRSG 126 and the steam gas turbine 128 can form part of a combined-cycle power generating plant, such as a natural gas combined-cycle (NGCC) plant. The gaseous exhaust stream 122 can be sent to the HRSG 126 in order to generate a stream of steam 130 and a cooled exhaust gas 132. In some embodiments, the steam 130 can be sent to the steam gas turbine 128 to generate additional electrical power.

FIG. 1 illustrates additional apparatus in the EGR system 124 that optionally may be incorporated in some implementations. The cooled exhaust gas 132 can be sent to at least one cooling unit 134 configured to reduce the temperature of the cooled exhaust gas 132 and generate a cooled recycle gas stream 140. In one or more embodiments, the cooling unit 134 can be a direct contact cooler, trim cooler, a mechanical refrigeration unit, or combinations thereof. The cooling unit 134 can also be configured to remove a portion of condensed water via a water dropout stream 138 which can, in at least one embodiment, be routed to the HRSG 126 via line 141 to provide a water source for the generation of additional steam 130. In one or more embodiments, the cooled recycle gas stream 140 can be directed to a boost compressor 142 (if required) fluidly coupled to the cooling unit 134. Cooling the cooled exhaust gas 132 in the cooling unit 134 can reduce the power required to compress the cooled recycle gas stream 140 in the boost compressor 142 or eliminate the need for it altogether.

The boost compressor 142 can be configured to increase the pressure of the cooled recycle gas stream 140 before it is introduced into the main compressor 104. As opposed to a conventional fan or blower system, the boost compressor 142 increases the overall density of the cooled recycle gas stream 140, thereby directing an increased mass flow rate for the same volumetric flow to the main compressor 104. Because the main compressor 104 is typically volume-flow limited, directing more mass flow through the main compressor 104 can result in a higher discharge pressure from the main compressor 104, thereby translating into a higher pressure ratio across the expander 106. A higher pressure ratio generated across the expander 106 can allow for higher inlet temperatures and, therefore, an increase in expander 106 power and efficiency. This can prove advantageous since the $CO_2$-rich discharge 116 generally maintains a higher specific heat capacity. Accordingly, the cooling unit 134 and the boost compressor 142, when incorporated, may each be adapted to optimize or improve the operation of the gas turbine system 102.

The main compressor 104 can be configured to compress the cooled recycle gas stream 140 received from the EGR system 124, such as from the boost compressor 142, to a pressure nominally above the combustion chamber 110 pressure, thereby generating the compressed recycle stream 144. In at least one embodiment, a purge stream 146 can be tapped from the compressed recycle stream 144 and subsequently treated in a $CO_2$ separator 148 to capture $CO_2$ at an elevated pressure via line 150. The separated $CO_2$ in line 150 can be used for sales, used in another process requiring carbon dioxide, and/or compressed and injected into a terrestrial reservoir for enhanced oil recovery (EOR), sequestration, or another purpose.

Figure 2:
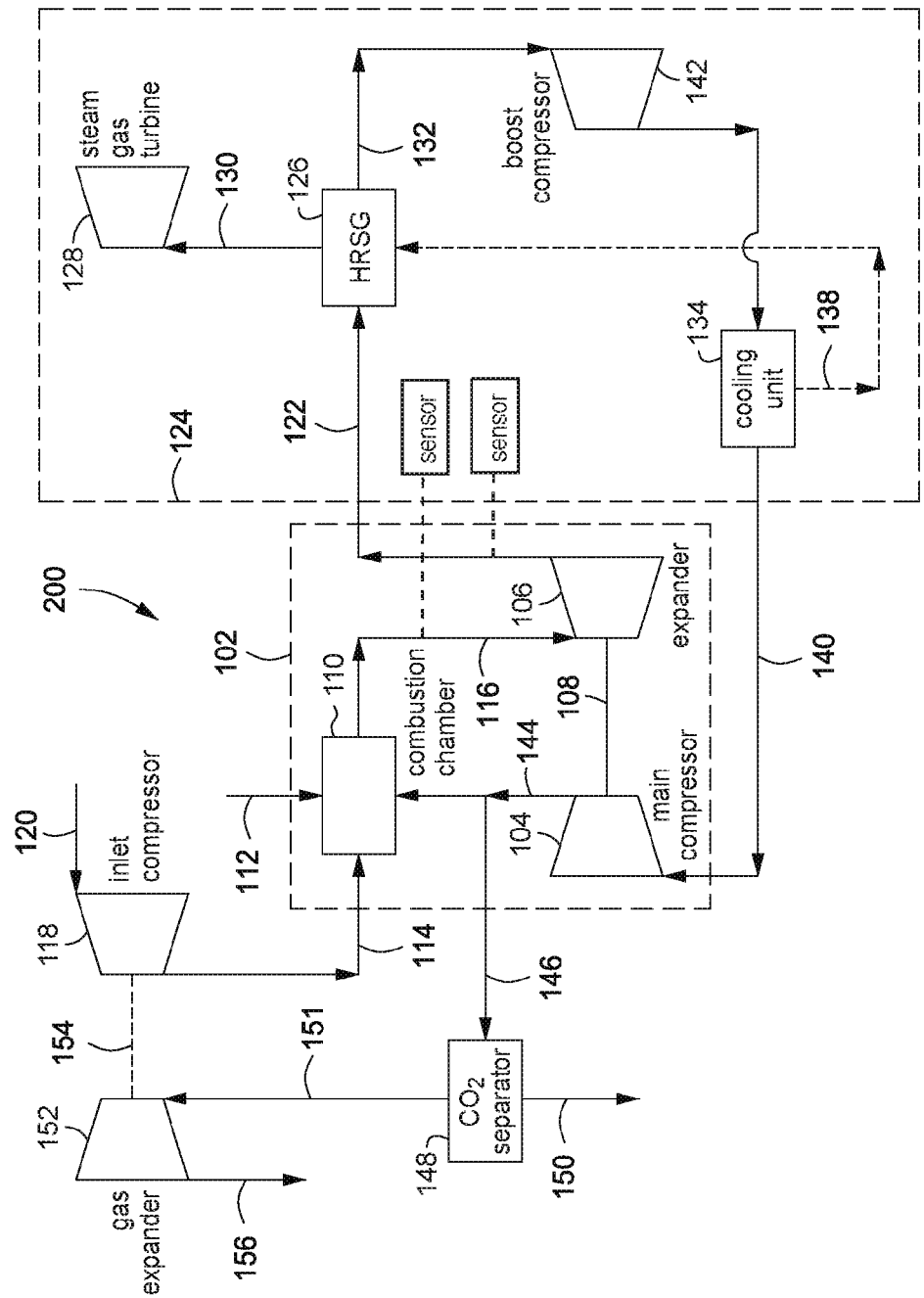
FIG. 2 depicts another integrated system for low emission power generation and enhanced $CO_2$ recovery, according to one or more embodiments of the present disclosure.
Figure 3:
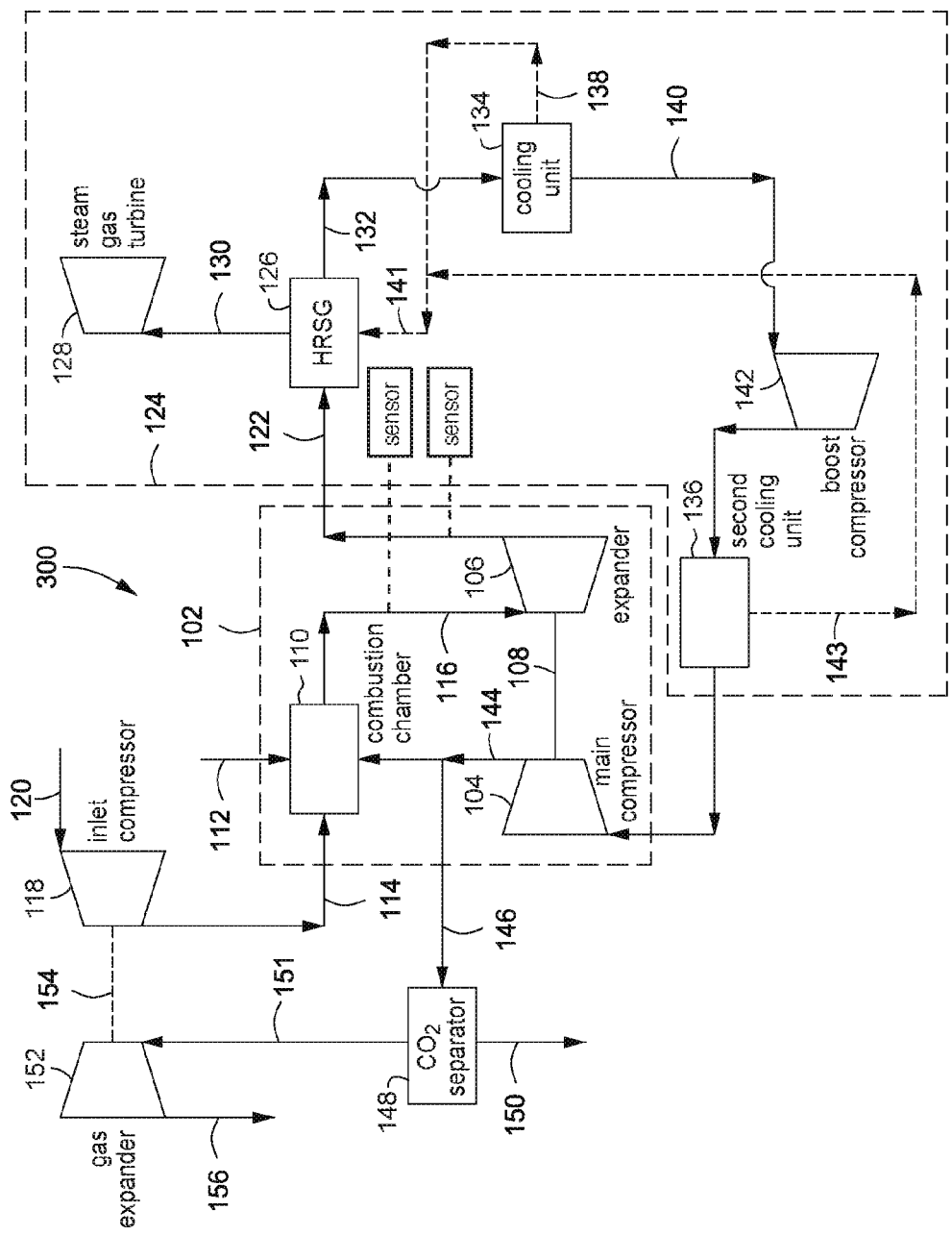
FIG. 3 depicts another integrated system for low emission power generation and enhanced $CO_2$ recovery, according to one or more embodiments of the present disclosure.

A residual stream 151, essentially depleted of $CO_2$ and consisting primarily of nitrogen, can be derived from the $CO_2$ separator 148. In one or more embodiments, the residual stream 151 can be expanded in a gas expander 152, such as a power-producing nitrogen expander, fluidly coupled to the $CO_2$ separator 148. As depicted in FIGS. 1-3, the gas expander 152 can be optionally coupled to the inlet compressor 118 through a common shaft 154 or other mechanical, electrical, or other power coupling, thereby allowing a portion of the power generated by the gas expander 152 to drive the inlet compressor 118. After expansion in the gas expander 152, an exhaust gas 156, consisting primarily of nitrogen, can be vented to the atmosphere or implemented into other downstream applications known in the art. For example, the expanded nitrogen stream can be used in an evaporative cooling process configured to further reduce the temperature of the exhaust gas as generally described in the concurrently filed U.S. Patent Application entitled "Stoichiometric Combustion with Exhaust Gas Recirculation and Direct Contact Cooler," the contents of which are hereby incorporated by reference to the extent not inconsistent with the present disclosure. In at least one embodiment, the combination of the gas expander 152, inlet compressor 118, and $CO_2$ separator can be characterized as an open Brayton cycle, or the third power producing component of the system 100.

While the combination or coupling of the gas expander 152 and the inlet compressor 118 may resemble an open Brayton cycle, the gas expander 152, whether coupled or uncoupled from the inlet compressor 118, provides a third power producing component of the system 100. For example, the gas expander 152 can be used to provide power to other applications, and not directly coupled to the stoichiometric compressor 118. For example, there may be a substantial mismatch between the power generated by the expander 152 and the requirements of the compressor 118. In such cases, the expander 152 could be adapted to drive a smaller compressor (not shown) that demands less power (or to drive the inlet compressor 118 and one or more additional facilities).

In yet other embodiments, as will be discussed below with reference to FIG. 8, the gas expander 152 can be replaced with a downstream compressor 188 configured to compress the residual stream 151 and generate a compressed exhaust gas 190 suitable for injection into a reservoir for pressure maintenance or EOR applications.

The EGR system 124 as described herein can be implemented to achieve a higher concentration of $CO_2$ in the working fluid of the power generation system 100, thereby allowing for more effective $CO_2$ separation for subsequent sequestration, pressure maintenance, or EOR applications. For instance, embodiments disclosed herein can effectively increase the concentration of $CO_2$ in the flue gas exhaust stream to about 10 vol % or higher. To accomplish this, the combustion chamber 110 can be adapted to stoichiometrically combust the incoming mixture of fuel 112 and compressed oxidant 114. In order to moderate the temperature of the stoichiometric combustion to meet expander 106 inlet temperature and component cooling requirements, a portion of the exhaust gas derived from the compressed recycle stream 144 can be injected into the combustion chamber 110 as a diluent. Thus, embodiments of the disclosure can essentially eliminate any excess oxygen from the working fluid while simultaneously increasing its $CO_2$ composition. As such, the gaseous exhaust stream 122 can have less than about 3.0 vol % oxygen, or less than about 1.0 vol % oxygen, or less than about 0.1 vol % oxygen, or even less than about 0.001 vol % oxygen. In some implementations, the combustion chamber 110, or more particularly, the inlet streams to the combustion chamber may be controlled with a preference to substoichiometric combustion to further reduce the oxygen content of the gaseous exhaust stream 122.

The specifics of exemplary operation of the system 100 will now be discussed. As can be appreciated, specific temperatures and pressures achieved or experienced in the various components of any of the embodiments disclosed herein can change depending on, among other factors, the purity of the oxidant used and the specific makes and/or models of expanders, compressors, coolers, etc. Accordingly, it will be appreciated that the particular data described herein is for illustrative purposes only and should not be construed as the only interpretation thereof. For example, in one embodiment described herein, the inlet compressor 118 can be configured as a stoichiometric compressor that provides compressed oxidant 114 at pressures ranging between about 280 psia and about 300 psia. Also contemplated herein, however, is aeroderivative gas turbine technology, which can produce and consume pressures of up to about 750 psia and more.

The main compressor 104 can be configured to recycle and compress recycled exhaust gas into the compressed recycle stream 144 at a pressure nominally above or at the combustion chamber 110 pressure, and use a portion of that recycled exhaust gas as a diluent in the combustion chamber 110. Because amounts of diluent needed in the combustion chamber 110 can depend on the purity of the oxidant used for stoichiometric combustion or the model of expander 106, a ring of thermocouples and/or oxygen sensors (not shown) can be associated with the combustion chamber and/or the expander. For example, thermocouples and/or oxygen sensors may be disposed on the outlet of the combustion chamber 110, on the inlet to the expander 106, and/or on the outlet of the expander 106. In operation, the thermocouples and sensors can be adapted to determine the compositions and/or temperatures of one or more streams for use in determining the volume of exhaust gas required as diluent to cool the products of combustion to the required expander inlet temperature. Additionally or alternatively, the thermocouples and sensors may be adapted to determine the amount of oxidant to be injected into the combustion chamber 110. Thus, in response to the heat requirements detected by the thermocouples and the oxygen levels detected by the oxygen sensors, the volumetric mass flow of compressed recycle stream 144 and/or compressed oxidant 114 can be manipulated or controlled to match the demand. The volumetric mass flow rates may be controlled through any suitable flow control systems.

In at least one embodiment, a pressure drop of about 12-13 psia can be experienced across the combustion chamber 110 during stoichiometric combustion. Combustion of the fuel 112 and the compressed oxidant 114 can generate temperatures between about 2000° F. and about 3000° F. and pressures ranging from 250 psia to about 300 psia. Because of the increased mass flow and higher specific heat capacity of the $CO_2$-rich working fluid derived from the compressed recycle stream 144, a higher pressure ratio can be achieved across the expander 106, thereby allowing for higher inlet temperatures and increased expander 106 power.

The gaseous exhaust stream 122 exiting the expander 106 can have a pressure at or near ambient. In at least one embodiment, the gaseous exhaust stream 122 can have a pressure of about 15.2 psia. The temperature of the gaseous exhaust stream 122 can range from about 1180° F. to about 1250° F. before passing through the HRSG 126 to generate steam in line 130 and a cooled exhaust gas 132. The cooled exhaust gas 132 can have a temperature ranging from about 190° F. to about 200° F. In one or more embodiments, the cooling unit 134 can reduce the temperature of the cooled exhaust gas 132 thereby generating the cooled recycle gas stream 140 having a temperature between about 32° F. and 120° F., depending primarily on wet bulb temperatures in specific locations and during specific seasons.

According to one or more embodiments, the boost compressor 142 can be configured to elevate the pressure of the cooled recycle gas stream 140 to a pressure ranging from about 17.1 psia to about 21 psia. As a result, the main compressor 104 receives and compresses a recycled flue gas working fluid with a higher density and increased mass flow, thereby allowing for a substantially higher discharge pressure while maintaining the same or similar pressure ratio. In at least one embodiment, the temperature of the compressed recycle stream 144 discharged from the main compressor 104 can be about 800° F., with a pressure of around 280 psia.

The following table provides testing results and performance estimations based on combined-cycle gas turbines, with and without the added benefit of a boost compressor 142, as described herein.

TABLE 1

Triple-Cycle Performance Comparison

|  | Recirc. Cycle w/o Boost Compressor | Recirc. Cycle w/ Boost Compressor |
| --- | --- | --- |
| Power (MW) | | |
| Gas Turbine Expander Power | 1055 | 1150 |
| Main Compressor | 538 | 542 |
| Fan or Boost Compressor | 13 | 27 |
| Inlet Compressor | 283 | 315 |
| Total Compression Power | 835 | 883 |
| Net Gas Turbine Power | 216 | 261 |
| Steam Turbine Net Power | 395 | 407 |
| Standard Machinery Net Power | 611 | 668 |
| Aux. Losses | 13 | 15 |
| Nitrogen Expander Power | 156 | 181 |
| Combined Cycle Power | 598 | 653 |
| Efficiency | | |
| Fuel Rate (mBTU/hr) | 5947 | 6322 |
| Heat Rate (BTU/kWh) | 9949 | 9680 |
| Combined Cycle Eff. (% lhv) | 34.3 | 35.2 |
| $CO_2$ Purge Pressure (psia) | 280 | 308 |

As should be apparent from Table 1, embodiments including a boost compressor 142 can result in an increase in expander 106 power (i.e., "Gas Turbine Expander Power") due to the increase in pressure ratios. Although the power demand for the main compressor 104 can increase, its increase is more than offset by the increase in power output of the expander 106, thereby resulting in an overall thermodynamic performance efficiency improvement of around 1% lhv (lower heated value).

Moreover, the addition of the boost compressor 142 can also increase the power output of the nitrogen expander 152 and the $CO_2$ purge pressure in the purge stream 146 line. While the boost compressor 142 can increase the power output of the nitrogen expander 152, it can be seen in Table 1 that the nitrogen expander 152 is a significant contributor to the efficiency of the overall system 100 with or without the boost compressor.

An increase in purge pressure of the purge stream 146 can lead to improved solvent treating performance in the $CO_2$ separator 148 due to the higher $CO_2$ partial pressure. Such improvements can include, but are not limited to, a reduction in overall capital expenditures in the form of reduced equipment size for the solvent extraction process.

Referring now to FIG. 2, depicted is an alternative embodiment of the power generation system 100 of FIG. 1, embodied and described as system 200. As such, FIG. 2 may be best understood with reference to FIG. 1. Similar to the system 100 of FIG. 1, the system 200 of FIG. 2 includes a gas turbine system 102 coupled to or otherwise supported by an exhaust gas recirculation (EGR) system 124. The EGR system 124 in FIG. 2, however, can include an embodiment where the boost compressor 142 follows or may otherwise be fluidly coupled to the HRSG 126. As such, the cooled exhaust gas 132 can be compressed in the boost compressor 142 before being reduced in temperature in the cooling unit 134. Thus, the cooling unit 134 can serve as an aftercooler adapted to remove the heat of compression generated by the boost compressor 142. As with previously disclosed embodiments, the water dropout stream 138 may or may not be routed to the HRSG 126 to generate additional steam 130.

The cooled recycle gas stream 140 can then be directed to the main compressor 104 where it is further compressed, as discussed above, thereby generating the compressed recycle stream 144. As can be appreciated, cooling the cooled exhaust gas 132 in the cooling unit 134 after compression in the boost compressor 142 can reduce the amount of power required to compress the cooled recycle gas stream 140 to a predetermined pressure in the succeeding main compressor 104.

FIG. 3 depicts another embodiment of the low emission power generation system 100 of FIG. 1, embodied as system 300. As such, FIG. 3 may be best understood with reference to FIGS. 1 and 2. Similar to the systems 100, 200 described in FIGS. 1 and 2, respectively, the system 300 includes a gas turbine system 102 supported by or otherwise coupled to an EGR system 124. The EGR system 124 in FIG. 3, however, can include a first cooling unit 134 and a second cooling unit 136, having the boost compressor 142 fluidly coupled therebetween. As with previous embodiments, each cooling unit 134, 136 can be a direct contact cooler, trim cooler, or the like, as known in the art.

In one or more embodiments, the cooled exhaust gas 132 discharged from the HRSG 126 can be sent to the first cooling unit 134 to produce a condensed water dropout stream 138 and a cooled recycle gas stream 140. The cooled recycle gas stream 140 can be directed to the boost compressor 142 in order to boost the pressure of the cooled recycle gas stream 140, and then direct it to the second cooling unit 136. The second cooling unit 136 can serve as an aftercooler adapted to remove the heat of compression generated by the boost compressor 142, and also remove additional condensed water via a water dropout stream 143. In one or more embodiments, each water dropout stream 138, 143 may or may not be routed to the HRSG 126 to generate additional steam 130.

The cooled recycle gas stream 140 can then be introduced into the main compressor 104 to generate the compressed recycle stream 144 nominally above or at the combustion chamber 110 pressure. As can be appreciated, cooling the cooled exhaust gas 132 in the first cooling unit 134 can reduce the amount of power required to compress the cooled recycle gas stream 140 in the boost compressor 142. Moreover, further cooling exhaust in the second cooling unit 136 can reduce the amount of power required to compress the cooled recycle gas stream 140 to a predetermined pressure in the succeeding main compressor 104.

Figure 4:
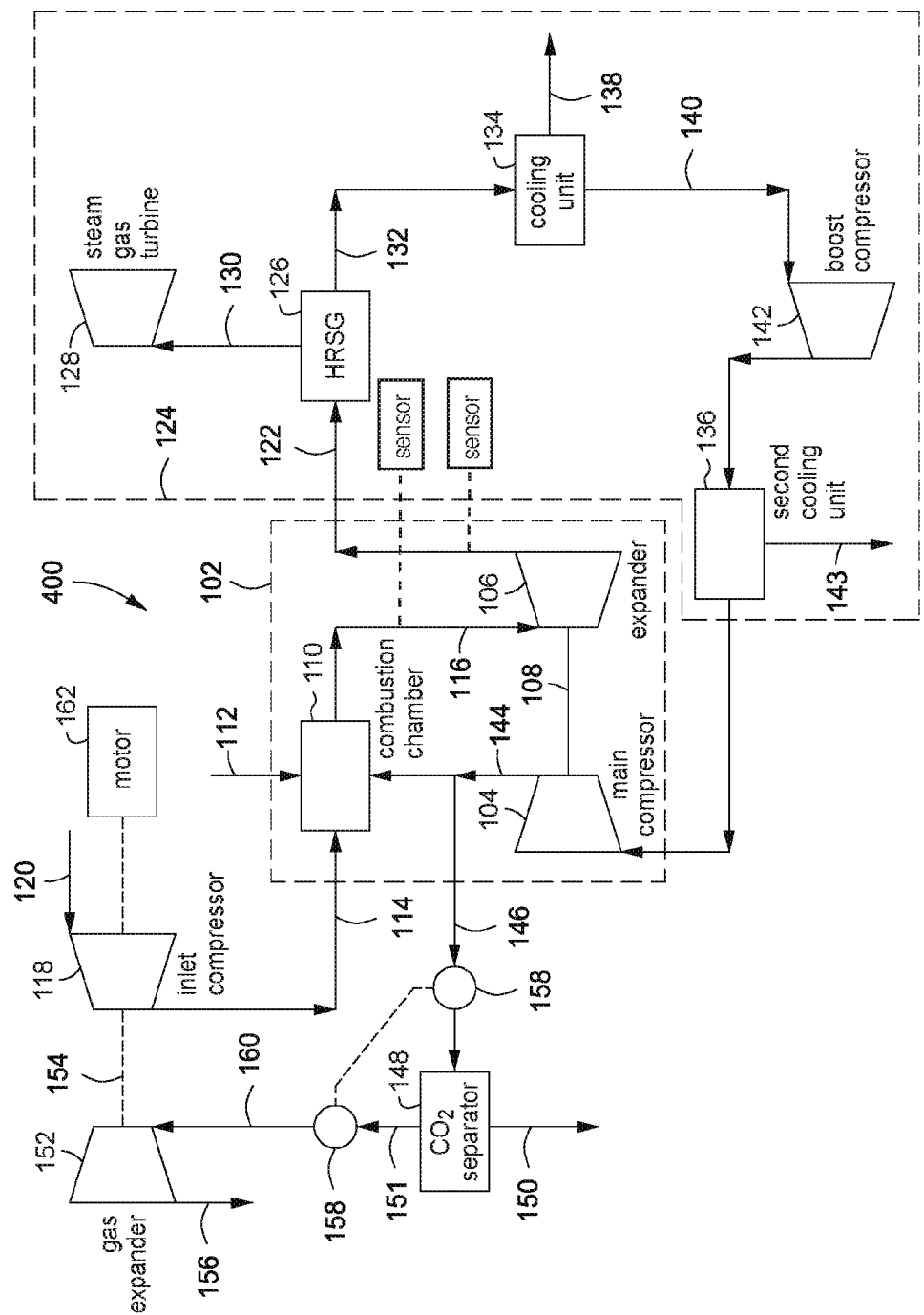
FIG. 4 depicts another integrated system for low emission power generation and enhanced $CO_2$ recovery, according to one or more embodiments of the present disclosure.

Referring now to FIG. 4, depicted is another embodiment of a low emission power generation system 400, similar in some respects to the system 300 of FIG. 3. As such, the system 400 of FIG. 4 may be best understood with reference to FIGS. 1 and 3. It should be noted, however, that individual embodiments, or combinations thereof disclosed with reference to FIGS. 1-3 can be implemented and/or omitted in conjunction with the system 400 of FIG. 4 without departing from the scope of the disclosure. For example, the specific facilities and equipment incorporated into the EGR system 124 may vary as described elsewhere herein.

As described above, the temperature of the compressed recycle stream 144 discharged from the main compressor 104 can be about 800° F., and exhibit pressures of around 280 psia. Consequently, the purge stream 146 tapped from the compressed recycle stream 144 can exhibit similar temperatures and pressures. It should be noted once again that specific temperatures and pressures will inevitably change depending on the specific make and model of expanders, compressors, coolers, etc. Since the pressure is much higher than those found in conventional natural gas combined-cycle (NGCC) systems with post-combustion $CO_2$ recovery, it facilitates the use of a less energy-intensive gas treating process in the $CO_2$ separator 148. For example, such elevated temperatures and pressures, in combination with a substantial lack of oxygen resulting from the stoichiometric combustion undertaken in the combustion chamber 110, can allow for the use of a hot potassium carbonate solvent to extract $CO_2$ from the purge stream 146. In other embodiments, $CO_2$ selective adsorbents can include, but are not limited to, monoethanolamine ("MEA"), diethanolamine ("DEA"), triethanolamie ("TEA"), potassium carbonate, methyldiethanolamine ("MDEA"), activated methyldiethanolamine ("aMDEA"), diglycolamine ("DGA"), diisopropanolamine ("DIPA"), piperazine ("PZ"), derivatives thereof, mixtures thereof, or any combination thereof. Other suitable adsorbents and techniques can include, but are not limited to, propylene carbonate physical adsorbent solvent as well as other alkyl carbonates, dimethyl ethers of polyethylene glycol of two to twelve glycol units (Selexol™ process), n-methyl-pyrrolidone, sulfolane, and use of the Sulfinol® Gas Treatment Process.

In one embodiment, the gas treating processes in the $CO_2$ separator 148 can require the temperature of the purge stream 146 to be cooled to about 250° F.-300° F. To achieve this, the purge stream 146 can be channeled through a heat exchanger 158, such as a cross-exchange heat exchanger fluidly coupled to the residual stream 151. In some embodiments, the heat exchanger 158 may be a shell-and-tube heat exchanger, a plate heat exchanger, a plate-and-frame heat exchanger, or any other heat exchanger known in the art and suitable to cool the purge stream 146 by facilitating the transfer of heat from the purge stream 146 to the residual stream 151 by indirect contact through another material (e.g., through metal tube walls in shell-and-tube heat exchanger or through metal plates in a plate or plate-and-frame heat exchanger). In at least one embodiment, extracting $CO_2$ from the purge stream 146 in the $CO_2$ separator 148 can leave a nitrogen-rich residual stream 151 at or near the elevated pressure of the purge stream 146 and at a temperature of about 150° F. In one embodiment, the heat energy associated with cooling the purge stream 146 can be extracted via the heat exchanger 158 and used to re-heat the residual stream 151, thereby generating a heated nitrogen vapor 160 having a temperature of about 750° F. and a pressure of around 270-280 psia. While heat exchange with the purge stream 146 is one manner of heating the residual stream 151, other methods are within the scope of the present disclosure. For example, in one or more embodiments supplemental heating of residual stream 151 may be done by using the HRSG 126 to supply heat as well as well as to generate steam 130. Other exemplary methods are described herein and should not be considered an exhaustive listing of available methods to heat the residual stream 151.

In one or more embodiments, the heated nitrogen vapor 160 can then be expanded through the gas expander 152. Accordingly, cross-exchanging the heat in the heat exchanger 158 can be configured to capture a substantial amount of compression energy derived from the main compressor 104 and use it to maximize the power extracted from the gas expander 152, and optionally power the stoichiometric inlet compressor 118. In at least one embodiment, the exhaust gas 156, consisting primarily of nitrogen at atmospheric pressure, can be harmlessly vented to the atmosphere or implemented into other downstream applications known in the art. Exemplary downstream applications, such as evaporative cooling processes, are described in the concurrently filed U.S. Patent Application entitled "Stoichiometric Combustion with Exhaust Gas-Recirculation and Direct Contact Cooler," as stated above.

During start-up of the system 400 and during normal operation when the gas expander 152 may be unable to supply all the required power to operate the inlet compressor 118, at least one motor 162, such as an electric motor, can be used synergistically with the gas expander 152. For instance, the motor(s) 162 can be sensibly sized such that during normal operation of the system 400, the motor(s) 162 can be configured to supply the power short-fall from the gas expander 152. Additionally or alternatively, there may be times during operation when the gas expander 152 produces more energy than required by the inlet compressor 118. In some implementations, the at least one motor 162 may be a motor/generator system that may be selectively configured to provide power, such as from the electric grid, to the compressor or to generate electricity from the power generated by the turbine 152.

Figure 5:
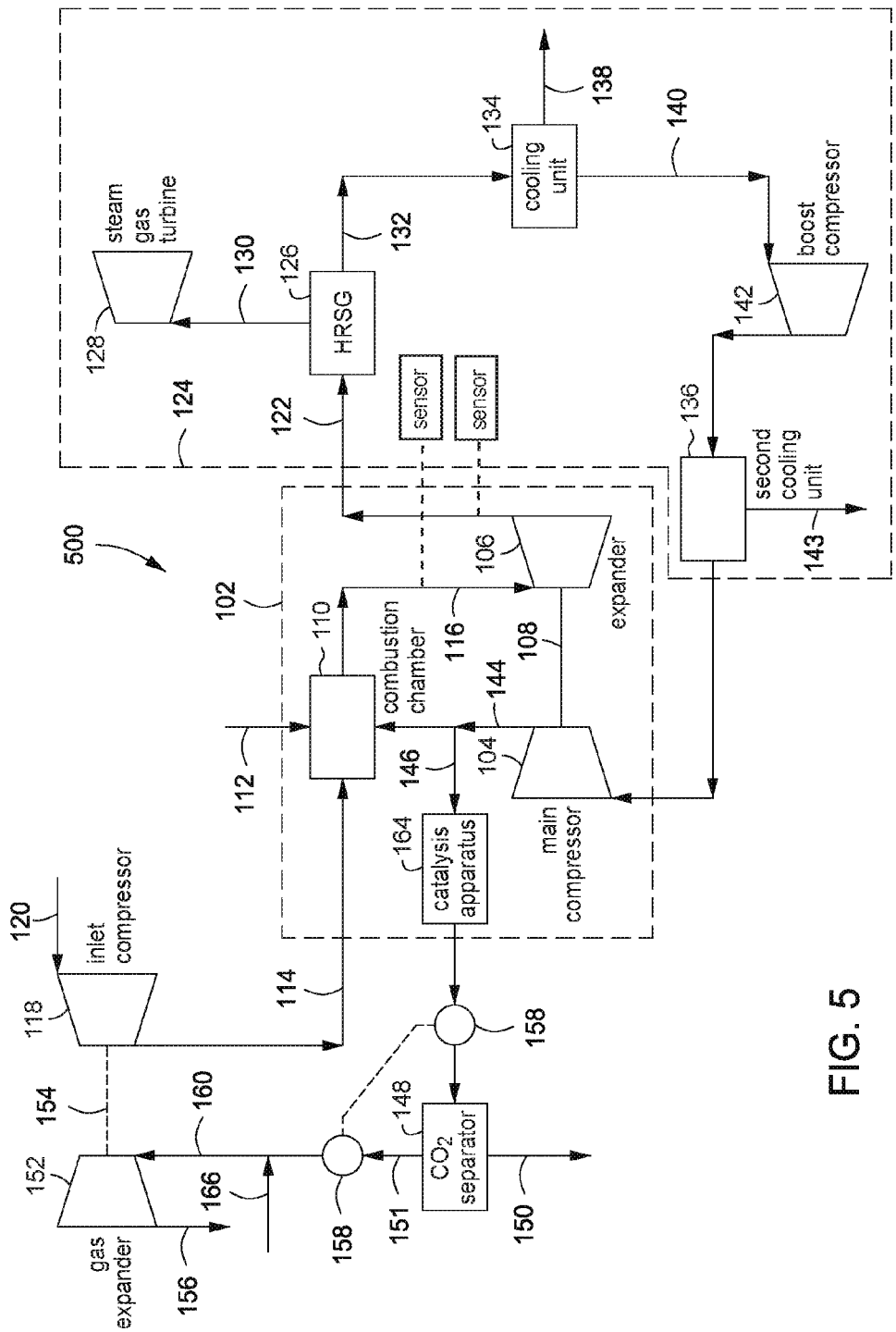
FIG. 5 depicts another integrated system for low emission power generation and enhanced $CO_2$ recovery, according to one or more embodiments of the present disclosure.

Referring now to FIG. 5, depicted is another embodiment of a low emission power generation system 500, similar in some respects to the system 400 of FIG. 4. As such, the entire system 500 of FIG. 5 will not be described in detail but may be best understood with reference to FIGS. 1, 3, and 4. It should be noted that any embodiment disclosed with reference to FIGS. 1-4 can be implemented individually or in combination into the system 500, without departing from the scope of the disclosure.

In an embodiment, once the purge stream 146 is tapped from the compressed recycle stream 144, its temperature can be increased by a catalytic process undertaken in a catalysis apparatus 164. In operation, the catalysis apparatus 164 can be configured to reduce the oxygen and/or carbon monoxide content in the purge stream, and convert it into residual $CO_2$ and heat. The catalysis apparatus 164 can be a single device or a plurality of devices in parallel, series, or a combination of parallel and series. In one embodiment, the catalysis apparatus 164 can be a small device requiring only a small amount of power to operate. One exemplary catalysis apparatus 164 can include an oxygen reduction catalyst that is normally used in a HRSG to meet emissions requirements. Such a system generally is not designed to remove large amounts of oxygen, but if significant amounts of oxygen remain in compressed recycle stream 144, the purge stream 146 can be recycled through the catalysis apparatus 164 more than once before further processing or use, e.g., compression and injection for enhanced oil recovery (EOR), $CO_2$ separation, etc.

Moreover, any residual hydrocarbons in the purge stream 146 can also be combusted in the catalysis apparatus 164. In at least one embodiment, the temperature of the purge stream 146 can be increased from about 785° F. to about 825° F. by the complete catalytic conversion of about 1200 ppm oxygen present in the purge stream 146. Illustrative catalysts that can be used in the catalysis apparatus 164 can include, but are not limited to, Nickel, Platinum, Rhodium, Ruthenium, Palladium, or derivatives thereof, mixtures thereof, any combination thereof. This increase in heat content can be introduced into the heat exchanger 158 and cross-exchanged with the nitrogen-rich residual stream 151, thereby resulting in a higher temperature of heated nitrogen vapor 160 and facilitating a more effective and powerful expansion process in the gas expander 152.

As still further enhancements to the triple-cycle system including the gas expander 152, in one or more embodiments, water can be injected via line 166 into the heated nitrogen vapor 160 to increase the mass throughput of the gas expander 152 and consequently increase the power generated. The water can be treated atomized water or steam. In at least one embodiment, the supplementary power provided by the injection of atomized water or steam can increase the power output from about 169 MW to about 181 MW. As can be appreciated, the power output will generally be dependent on the make and model of the gas expander. It should be noted that injecting atomized water or steam via line 166 into the heated nitrogen vapor 160 in order to increase the mass flow through the gas expander 152 can be implemented into any of the embodiments disclosed herein, without departing from the scope of the disclosure.

Figure 6:
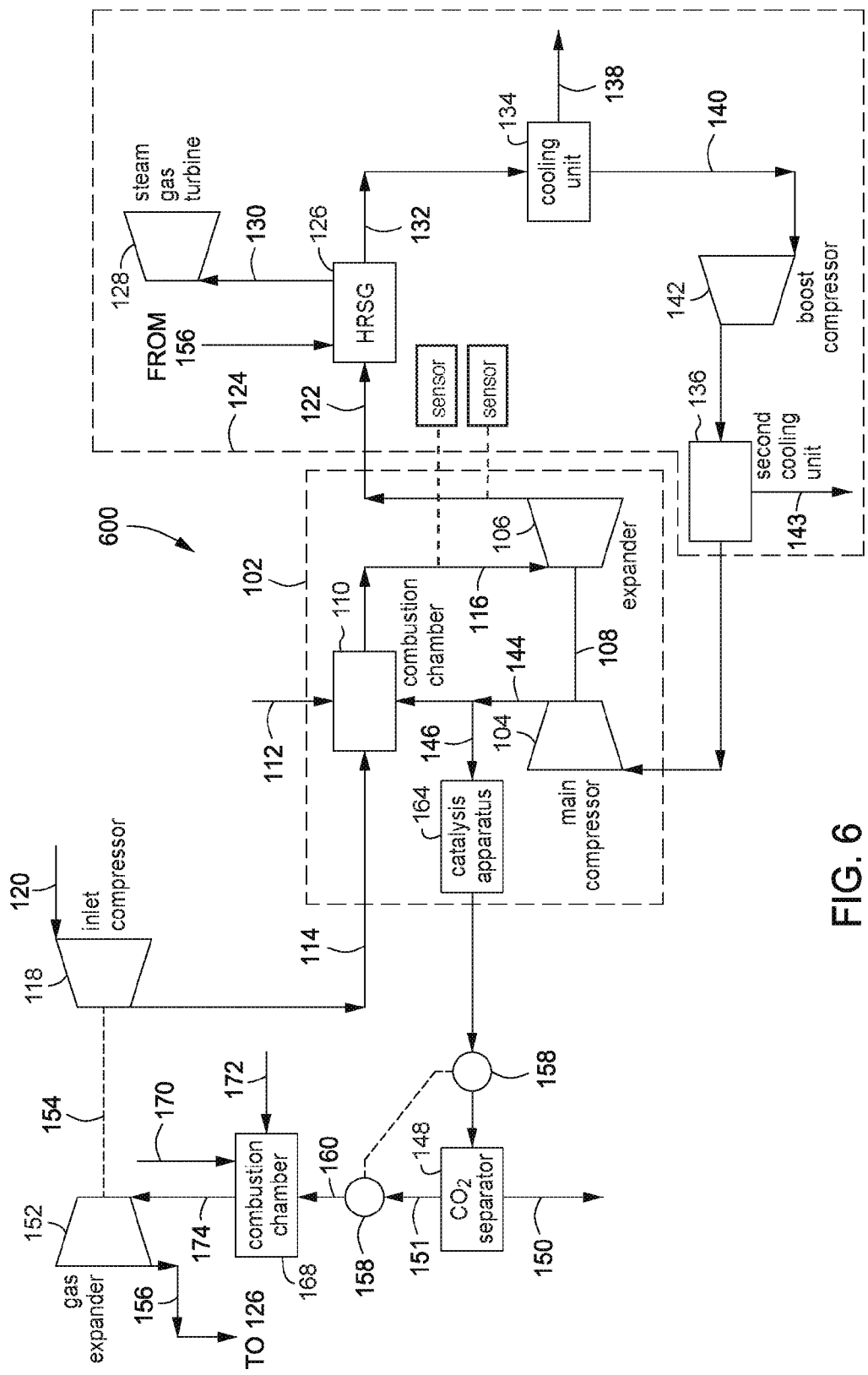
FIG. 6 depicts another integrated system for low emission power generation and enhanced $CO_2$ recovery, according to one or more embodiments of the present disclosure.

Referring to FIG. 6, depicted is another embodiment of a low emission power generation system 600, similar to the system 500 of FIG. 5. As such, the entire system 600 will not be described in detail but may be best understood with reference to FIG. 5. In one embodiment, the system 600 can include an additional stoichiometric combustion chamber 168 disposed prior to the gas expander 152. The combustion chamber 168 can be configured to stoichiometrically combust a combination of fuel 170 and compressed oxidant 172, much like the combustion chamber 110 described above, in order to generate a discharge stream 174 at an elevated temperature and pressure. In one embodiment, the fuel 170 and the compressed oxidant 172 can be derived from the same source as the fuel 112 and the compressed oxidant 114, respectively, that are fed into the first combustion chamber 110. In implementations incorporating the additional combustion chamber 168, the heat exchanger 158 may cool the purge stream through other means, such as by heating one or more other streams in the system 600 or elsewhere. For example, the heat exchanger on the purge stream may provide additional heat to the HRSG or to a reforming process.

In other embodiments, especially embodiments where zero $CO_2$ emissions is desired or required, the fuel 170 can consist primarily of hydrogen. In at least one embodiment, the hydrogen fuel can be produced by reforming methane in the HRSG 126, or a separate HRSG (not shown). After the reformation of the methane and a water gas shift, the $CO_2$ in the hydrogen product stream can be removed in an absorption tower (not shown), for example, in the $CO_2$ separator 148. The hydrogen could then be blended with some of the nitrogen in the heated nitrogen vapor 160 stream within the combustion chamber 168 to make an acceptable gas turbine fuel.

The heated nitrogen vapor 160 discharged from the heat exchanger 158, or discharged from the $CO_2$ separator 148, can serve as a diluent configured to moderate the temperature of combustion and the discharge stream 174. In at least one embodiment, the discharge stream 174 exiting the combustion chamber 168 can have a temperature of about 2500° F. before being expanded in the gas expander to create mechanical power. As will be appreciated, the combination of the gas expander 152, combustion chamber 168, and inlet compressor 118 can be characterized as a separate standard gas turbine system, where the inlet compressor 118 becomes the compressor end and the gas expander 152 becomes the expander end of the gas turbine.

In one or more embodiments, the exhaust gas 156 can have a temperature of about 1100° F. In at least one embodiment, the exhaust gas 156 can be directed to the HRSG 126 to recover the heat as power in the steam gas turbine 128. In other embodiments, the exhaust gas 156 can be directed to an external HRSG and steam gas turbine (not shown) to generate power for other applications. In any event, the nitrogen-rich residual stream 151 may be disposed of in any of the manners discussed herein, such as via nitrogen vent, via sequestration, EOR, or pressure maintenance operations, etc., after passing through the expander 152.

Figure 7:
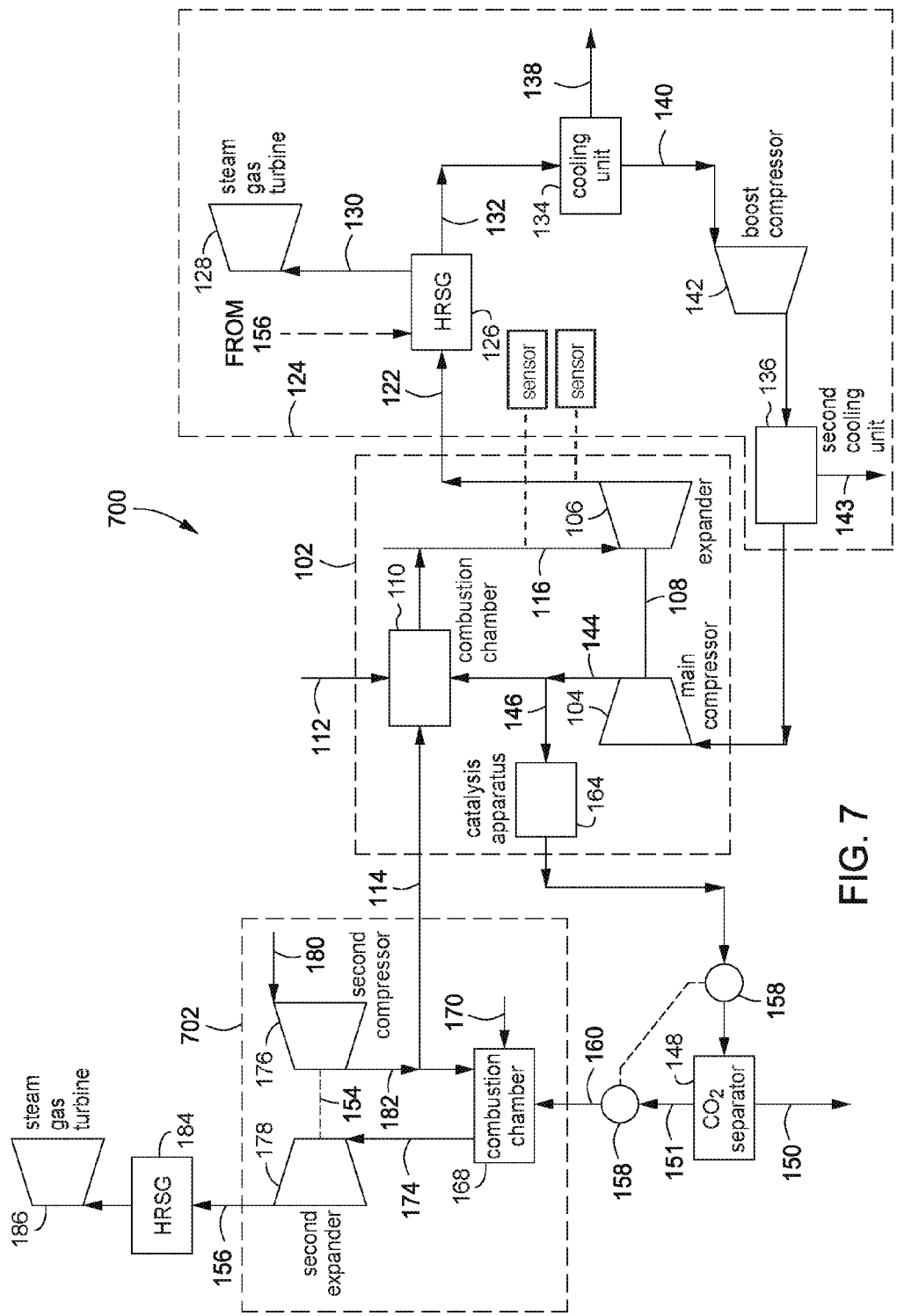
FIG. 7 depicts another integrated system for low emission power generation and enhanced $CO_2$ recovery, according to one or more embodiments of the present disclosure.

Referring now to FIG. 7, depicted is another embodiment of a low emission power generation system 700, similar to the system 600 of FIG. 6. As such, the entire system 700 of FIG. 7 will not be described in detail but may be best understood with reference to FIG. 6 and its accompanying description. Instead of utilizing a separate inlet compressor 118 and nitrogen expander 152 (see FIGS. 1-6), the system 700 as depicted in FIG. 7 can include a second gas turbine system 702, having a second compressor 176 and second expander 178. In one or more embodiments, the second compressor 176 can receive and compress a second feed oxidant 180. Similar to the feed oxidant 120 shown and described above in FIGS. 1-6, the second feed oxidant 180 can include any suitable gas containing oxygen, such as air, oxygen-rich air, or combinations thereof. The second compressor 176 can be configured to compress the second feed oxidant 180 and generate a second compressed oxidant 182. As depicted, the compressed oxidant 114 required for the combustion chamber 110 can be supplied or extracted from the second compressed oxidant 182 stream and serve the same function as generally described above.

In operation, the combustion chamber 168 can be configured to stoichiometrically combust a combination of the fuel 170 and the second compressed oxidant 182 in order to generate a discharge stream 174 at an elevated temperature and pressure. In one or more embodiments, the nitrogen vapor 160 from the heat exchanger 158 or the residual stream from the $CO_2$ separator 148 can be utilized as a diluent configured to moderate the temperature of combustion in the second combustion chamber 168. In one embodiment, the fuel 170 can be derived from the same source as the fuel 112 fed into the first combustion chamber 110, such as a hydrocarbon fuel. In other embodiments where zero $CO_2$ emissions is desired or required, the fuel 170 can consist primarily of hydrogen, as generally described above with reference to FIG. 6.

If a hydrocarbon fuel is used, then $CO_2$ emissions will naturally result. However, because of the use of a largely-pure nitrogen stream as a diluent, the resulting $CO_2$ emissions will be significantly less than when compared with a conventional NGCC power plant. For example, in one embodiment, the $CO_2$ emissions resulting from the system 700 will only be about 80 lbs/MWhr as compared with about 400 lbs/MWhr for a conventional NGCC power plant. In one or more embodiments, the exhaust gas 156 from the second expander 178 can have a temperature of about 1100° F. In at least one embodiment, the exhaust gas 156 can be directed to a second HRSG 184 to recover the heat as power in a separate steam gas turbine 186. In alternative embodiments, however, the exhaust gas 156 can be directed to the first HRSG 126 to recover the heat as power in the steam gas turbine 128. Here again, it can be understood that exhaust gas 156 may be vented or otherwise used in hydrocarbon recovery operations (not shown) as described above after passing through the second HRSG 184.

As can be appreciated, the system 700 of FIG. 7 can allow a commercially-available gas turbine to be utilized instead of undergoing costly upgrades to obtain a custom-built air compressor and a custom-built expander. The system 700 can also produce more net power at a higher efficiency because the inlet temperature of the second expander 178 can reach temperatures around 2500° F.

Figure 8:
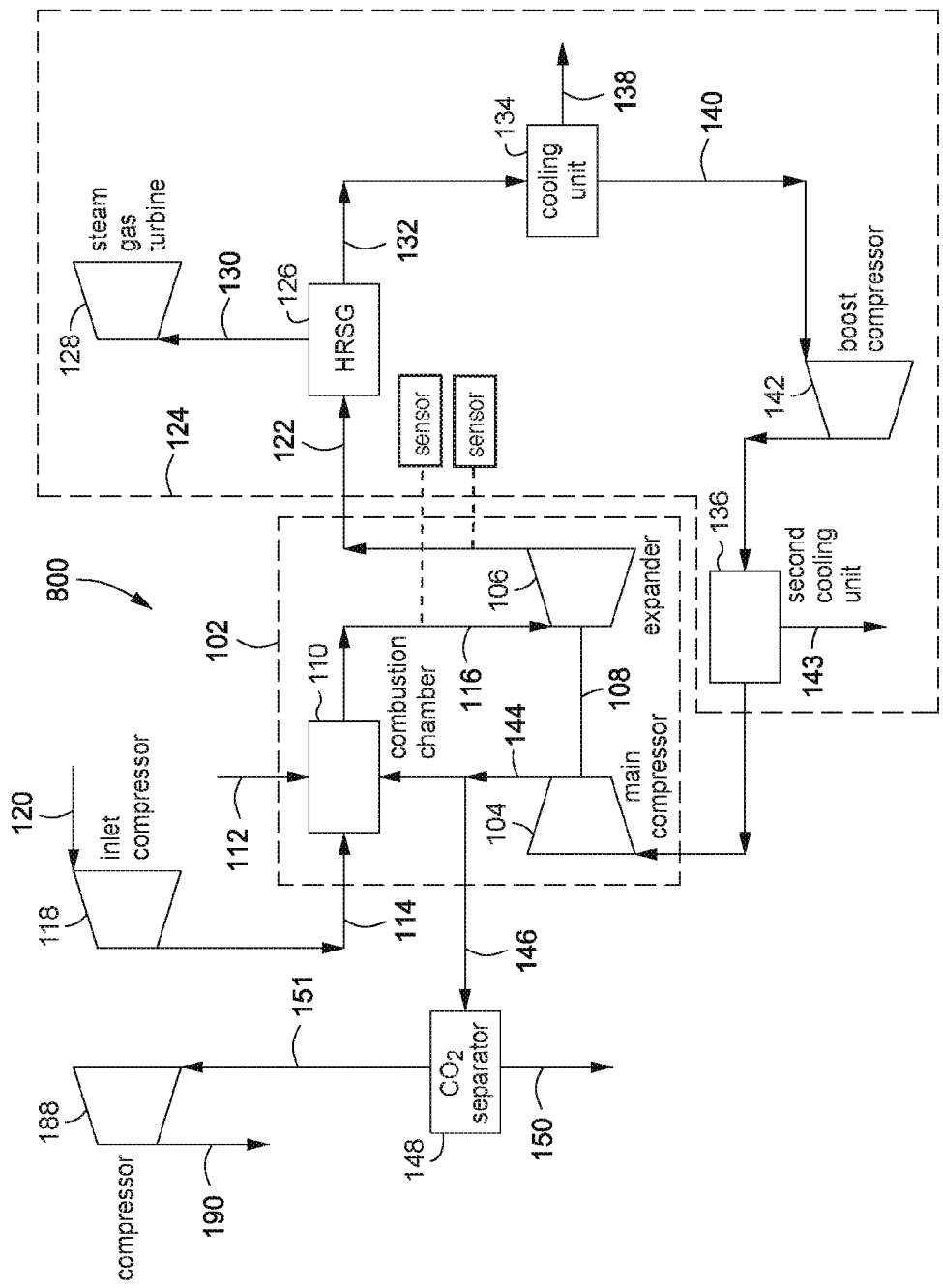
FIG. 8 depicts another integrated system for low emission power generation and enhanced $CO_2$ recovery, according to one or more embodiments of the present disclosure.

Referring now to FIG. 8, depicted is another embodiment of a low emission power generation system 800, similar to the system 300 of FIG. 3. As such, the entire system 800 of FIG. 8 will not be described in detail but may be best understood with reference to FIGS. 1 and 3. It should be noted, however, that embodiments disclosed with reference to FIGS. 1-6 can be implemented individually or in combination with the system 800 of FIG. 8 without departing from the scope of the disclosure. In an exemplary embodiment, the residual stream 151, consisting primarily of nitrogen derived from the $CO_2$ separator 148, can be channeled to a downstream compressor 188. The downstream compressor 188 can be configured to compress the residual stream 151 and generate a compressed exhaust gas 190 having a pressure of, for example, about 3400 psi or pressures otherwise suitable for injection into a reservoir for pressure maintenance applications.

Compressing the residual stream 151 with the downstream compressor 188 may prove advantageous in applications where methane gas is typically reinjected into hydrocarbon wells to maintain well pressures. According to embodiments disclosed herein, nitrogen can instead be injected into hydrocarbon wells and the residual methane gas can either be sold or otherwise used as a fuel in related applications, such as providing fuel for the fuel streams 112, 170 (see FIGS. 6 and 7).

With continuing reference to FIGS. 5-7, the following table provides testing results and performance estimations based on systems without an expansion cycle (e.g., system 800 of FIG. 8), systems without additional firing in the combustion chamber 168 (e.g., system 500 of FIG. 5), and systems with additional firing in the combustion chamber 168 (e.g., systems 600, 700 of FIGS. 6 and 7, respectively). The data reflects a methane fuel 170 being fired for combustion.

TABLE 2

Triple-Cycle Performance Comparison

|  | Cycle - No Expansion | Cycle w/o Firing | Cycle w/ Firing |
|---|---|---|---|
| Power (MW) |  |  |  |
| Gas Turbine Expander Power | 1150 | 1150 | 1150 |
| Main Compressor | 542 | 542 | 542 |
| Fan or Boost Compressor | 27 | 27 | 27 |
| Inlet Compressor | 315 | 251 | 601 |
| Total Compression Power | 883 | 883 | 1170 |
| Net Gas Turbine Power | 258 | 258 | −32 |
| Steam Turbine Net Power | 407 | 339 | 339 |
| Standard Machinery Net Power | 665 | 597 | 307 |
| Aux. Losses | 15 | 13 | 7 |
| Nitrogen Expander power | 0 | 203 | 1067 |
| Supp. Steam Turbine Power | 0 | 0 | 303 |
| Combined Cycle Power | 650 | 787 | 1670 |
| Efficiency |  |  |  |
| Fuel Rate (Mbtu/hr) | 6322 | 6322 | 11973 |
| Heat Rate (BTU/kWh) | 9727 | 8037 | 7167 |
| Combined Cycle Eff. (% lhv) | 35.1 | 42.5 | 47.6 |
| $CO_2$ Purge Pressure (psia) | 308 | 308 | 308 |

As should be apparent from Table 2, embodiments with firing in the combustion chamber 168 can result in a significantly higher combined-cycle power output; almost double the power output when compared with embodiments not implementing firing in the combustion chamber 168. Moreover, the overall thermodynamic performance efficiency exhibits a substantial uplift or improvement of around 3.3% lhv (lower heated value) for systems incorporating firing as disclosed herein, as opposed to embodiments not implementing such firing techniques.

While the present disclosure may be susceptible to various modifications and alternative forms, the exemplary embodiments discussed above have been shown only by way of example. However, it should again be understood that the disclosure is not intended to be limited to the particular embodiments disclosed herein. Indeed, the present disclosure includes all alternatives, modifications, and equivalents falling within the true spirit and scope of the appended claims.

What is claimed is:

1. An integrated system, comprising:
a gas turbine system having a first combustion chamber configured to substantially stoichiometrically combust a first compressed oxidant and a first fuel in the presence of a compressed recycle stream such that there is a ratio of oxygen supplied to oxygen required for stoichiometric combustion from 0.9:1 to 1.1:1, wherein the first combustion chamber directs a first discharge stream to an expander to generate a gaseous exhaust stream and at least partially drive a main compressor;
an exhaust gas recirculation system comprising at least one boost compressor configured to receive and boost the pressure of the gaseous exhaust stream before directing the gaseous exhaust stream into the main compressor, wherein the main compressor compresses the gaseous exhaust stream and thereby generates the compressed recycle stream, the compressed recycle stream acting as a first diluent to moderate the temperature of the first discharge stream;

a $CO_2$ separator fluidly coupled to the compressed recycle stream via a purge stream;

a second combustion chamber fluidly coupled to the $CO_2$ separator via a residual stream consisting primarily of nitrogen derived from the $CO_2$ separator, wherein the second combustion chamber is configured to substantially stoichiometrically combust a second fuel and a second compressed oxidant in the presence of the residual stream, the residual stream acting as a second diluent to moderate a temperature of combustion in the second combustion chamber, and wherein the first and second compressed oxidants and the first and second fuels are derived from same sources, respectively;

a heat exchanger fluidly coupled to both the purge stream and the residual stream and adapted to transfer heat from the purge stream to the residual stream prior to injection of the residual stream into the second combustion chamber; and a gas expander fluidly coupled to the second combustion chamber via a second discharge stream.

2. The system of claim 1, further comprising first and second cooling units fluidly coupled to the at least one boost compressor, the first cooling unit being configured to receive and cool the gaseous exhaust stream before introduction to the at least one boost compressor, and the second cooling unit being configured to receive the gaseous exhaust stream from the at least one boost compressor and further cool the gaseous exhaust stream to generate a cooled recycle gas.

3. The system of claim 1, wherein the heat exchanger is configured to transfer heat from the purge stream to the residual stream through an intermediate material to reduce a temperature of the purge stream and simultaneously increase the temperature of the residual stream.

4. The system of claim 1, further comprising a catalysis apparatus disposed in association with the purge stream, the catalysis apparatus being configured to increase a temperature of the purge stream prior to entering the heat exchanger.

5. The system of claim 1, wherein the gas expander is configured to expand the second discharge stream and thereby generate mechanical power and an exhaust gas.

6. The system of claim 5, further comprising an inlet compressor driven by the mechanical power generated by the gas expander, wherein the inlet compressor is configured to provide the first and second compressed oxidants.

7. A method of generating power, comprising:
stoichiometrically combusting a first compressed oxidant and a first fuel in a first combustion chamber and in the presence of a compressed recycle stream such that there is a ratio of oxygen supplied to oxygen required for stoichiometric combustion from 0.9:1 to 1.1:1, thereby generating a first discharge stream, wherein the compressed recycle stream acts as a first diluent to moderate a temperature of the first discharge stream;

expanding the first discharge stream in an expander to at least partially drive a first compressor and generate a gaseous exhaust stream;

directing the gaseous exhaust stream into the first compressor, wherein the first compressor compresses the gaseous exhaust stream and thereby generates the compressed recycle stream;

extracting a portion of the compressed recycle stream to a $CO_2$ separator via a purge stream, the $CO_2$ separator being fluidly coupled to a second combustion chamber via a residual stream derived from the $CO_2$ separator and consisting primarily of nitrogen;

using a heat exchanger fluidly coupled to both the purge stream and the residual stream to transfer heat from the purge stream to the residual stream to increase the temperature of the residual stream prior to injection of the residual stream into the second combustion chamber;

substantially stoichiometrically combusting a second compressed oxidant and a second fuel in the second combustion chamber in the presence of the residual stream to generate a second discharge stream, wherein the first and second compressed oxidants and the first and second fuels are derived from same sources, respectively;

moderating a temperature of combustion in the second combustion chamber with the residual stream discharged from the $CO_2$ separator acting as a second diluent;

expanding the second discharge stream in a gas expander; and using at least one of a boost compressor and a first cooling unit adapted to increase the mass flow rate of the gaseous exhaust stream to generate recycle gas.

8. The method of claim 7, comprising cooling the gaseous exhaust stream with the first cooling unit fluidly coupled to the at least one boost compressor, the first cooling unit being configured to receive and cool the gaseous exhaust stream before introduction to the at least one boost compressor.

9. The method of claim 8, further comprising cooling the gaseous exhaust stream from the at least one boost compressor with a second cooling unit fluidly coupled to the at least one boost compressor to generate the recycle gas.

10. The method of claim 7, further comprising driving an inlet compressor with the mechanical power generated by the gas expander, the inlet compressor being configured to generate the first and second compressed oxidants.

11. The method of claim 7, wherein the heat exchanger is configured to transfer heat from the purge stream to the residual stream through an intermediate material to reduce a temperature of the purge stream and simultaneously increase the temperature of the residual stream.

12. The method of claim 11, further comprising increasing the temperature of the purge stream by combusting oxygen and remaining fuel in a catalysis apparatus disposed within the purge stream prior to the heat exchanger.

13. An integrated system, comprising:
a first gas turbine system, comprising:
a first compressor configured to receive and compress a recycled exhaust gas and provide a first compressed recycle stream;
a first combustion chamber configured to receive the first compressed recycle stream, a first compressed oxidant, and a first fuel stream, the first combustion chamber being adapted to substantially stoichiometrically combust the first fuel stream and first compressed oxidant such that there is a ratio of oxygen supplied to oxygen required for stoichiometric combustion from 0.9:1 to 1.1:1, wherein the first compressed recycle stream serves as a first diluent to moderate combustion temperatures in the first combustion chamber;
a first expander coupled to the first compressor and configured to receive a first discharge from the first combustion chamber and generate the recycled exhaust gas and at least partially drive the first compressor; and a boost compressor configured to increase the pressure of the recycled exhaust gas before injection into the first compressor to provide the first compressed recycle stream;

a purge stream taken from the first compressed recycle stream and treated in a $CO_2$ separator to provide a $CO_2$ stream and a residual stream, the residual stream primarily comprising nitrogen; and a second gas turbine system fluidly coupled to the first gas turbine system via the purge stream, the second gas turbine system comprising:

a second compressor configured to receive and compress a feed oxidant and generate a second compressed oxidant, the first compressed oxidant being derived at least partially from the second compressed oxidant;

a second combustion chamber configured to receive the second compressed oxidant, the residual stream, and a second fuel stream, the second combustion chamber being adapted to substantially stoichiometrically combust the second fuel stream and second compressed oxidant in the presence of the residual stream, wherein the residual stream serves as a second diluent to moderate combustion temperatures in the second combustion chamber and the first and second fuels are derived from a same source;

a heat exchanger fluidly coupled to both the purge stream and the residual stream and adapted to transfer heat from the purge stream to the residual stream prior to injection of the residual stream into the second combustion chamber; and a second expander coupled to the second compressor and configured to receive a second discharge from the second combustion chamber and generate an exhaust and at least partially drive the second compressor.

14. The system of claim 13, wherein the second gas turbine system further comprises a heat recovery steam generator configured to receive the exhaust from the second expander and provide steam for a steam gas turbine.

15. The system of claim 13, wherein the heat exchanger is configured to transfer heat from the purge stream to the residual stream through an intermediate material to reduce a temperature of the purge stream and simultaneously increase the temperature of the residual stream.

* * * * *